(12) United States Patent
Wang et al.

(10) Patent No.: US 10,805,326 B1
(45) Date of Patent: Oct. 13, 2020

(54) SYSTEMS AND METHODS FOR THREAT VISUALIZATION WITH SIGNATURE COMPOSURE, SPATIAL SCALE AND TEMPORAL EXPANSION

(71) Applicant: Alert Logic, Inc., Houston, TX (US)

(72) Inventors: Dagen Wang, Houston, TX (US); Ian Rickey, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 343 days.

(21) Appl. No.: 15/819,357

(22) Filed: Nov. 21, 2017

Related U.S. Application Data

(60) Provisional application No. 62/424,974, filed on Nov. 21, 2016.

(51) Int. Cl.
*G06F 21/55* (2013.01)
*H04L 29/06* (2006.01)

(52) U.S. Cl.
CPC ...... *H04L 63/1425* (2013.01); *H04L 63/1416* (2013.01)

(58) Field of Classification Search
CPC . H04L 63/1425; H04L 63/1416; G06F 21/55; G06F 21/552; G06F 21/554
See application file for complete search history.

(56) References Cited

U.S. PATENT DOCUMENTS

| | | | |
|---|---|---|---|
| 2008/0016570 A1* | 1/2008 | Capalik | G06F 21/566 726/23 |
| 2011/0067106 A1* | 3/2011 | Evans | H04L 63/1416 726/23 |
| 2013/0333028 A1* | 12/2013 | Hagar | H04L 63/0236 726/22 |
| 2017/0149830 A1* | 5/2017 | Kim | H04L 63/1425 |

\* cited by examiner

*Primary Examiner* — Farid Homayounmehr
*Assistant Examiner* — Sanchit K Sarker
(74) *Attorney, Agent, or Firm* — Intrinsic Law Corp.

(57) ABSTRACT

A network security system collects event data over a long duration and mines the event data to identify unique conversations between each unique pair of a source network address and a destination network address. Events in each unique conversation are associated with signature identifiers that identify different types of attacks. Each signature thus identified is assigned with a unique visual clue. The unique visual clue has a particular visual character that reflects a number of occurrences of a particular event. For payload sizes associated with the event, a spatial scale representation is determined. The network security system generates a visualization relative to a conversation timeline for presentation on a user interface. The visualization contains unique visual clues for the different types of attacks associated with the signature identifiers and the spatial scale representation of the payload sizes associated with the events associated with the signature identifiers.

17 Claims, 23 Drawing Sheets

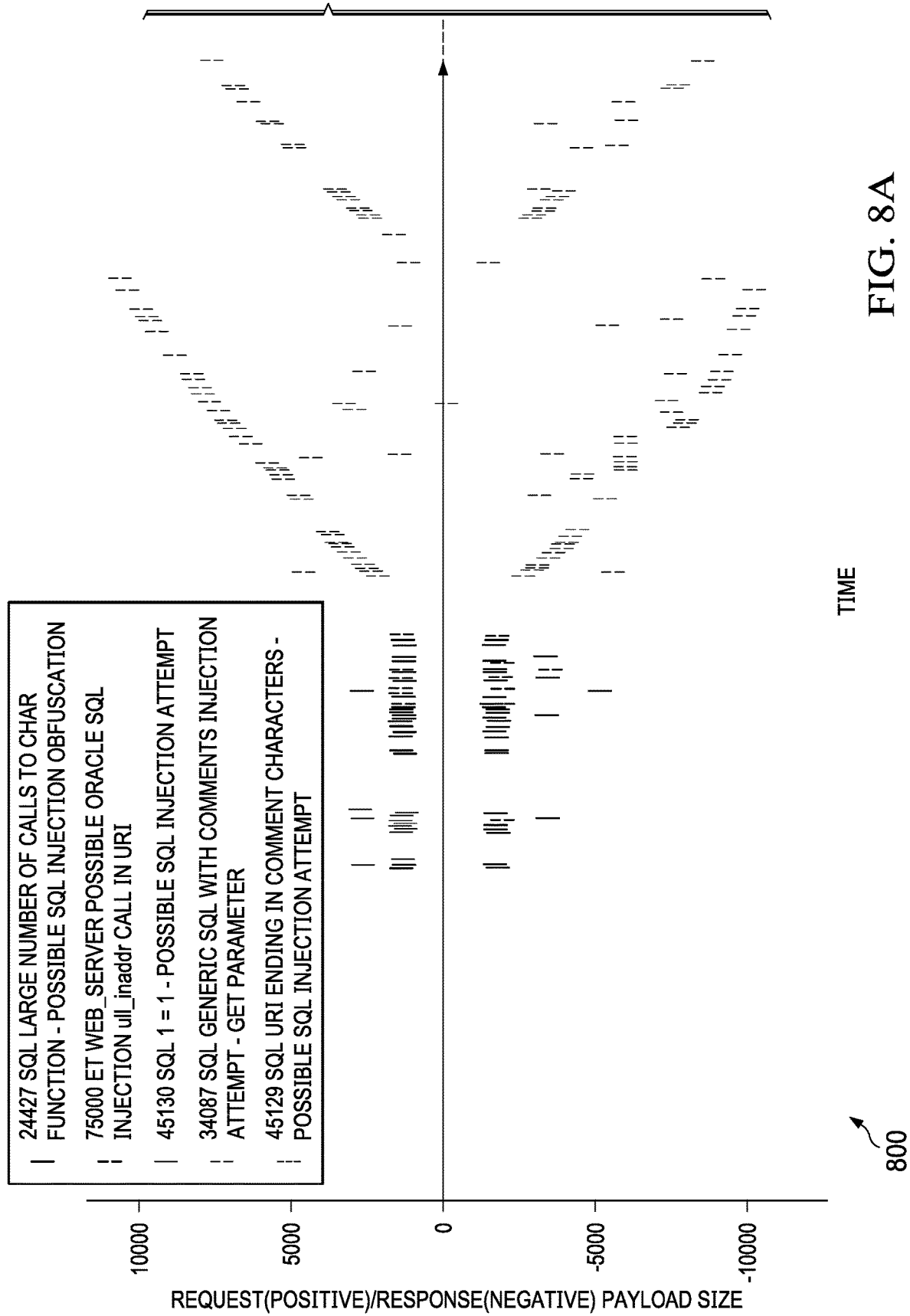

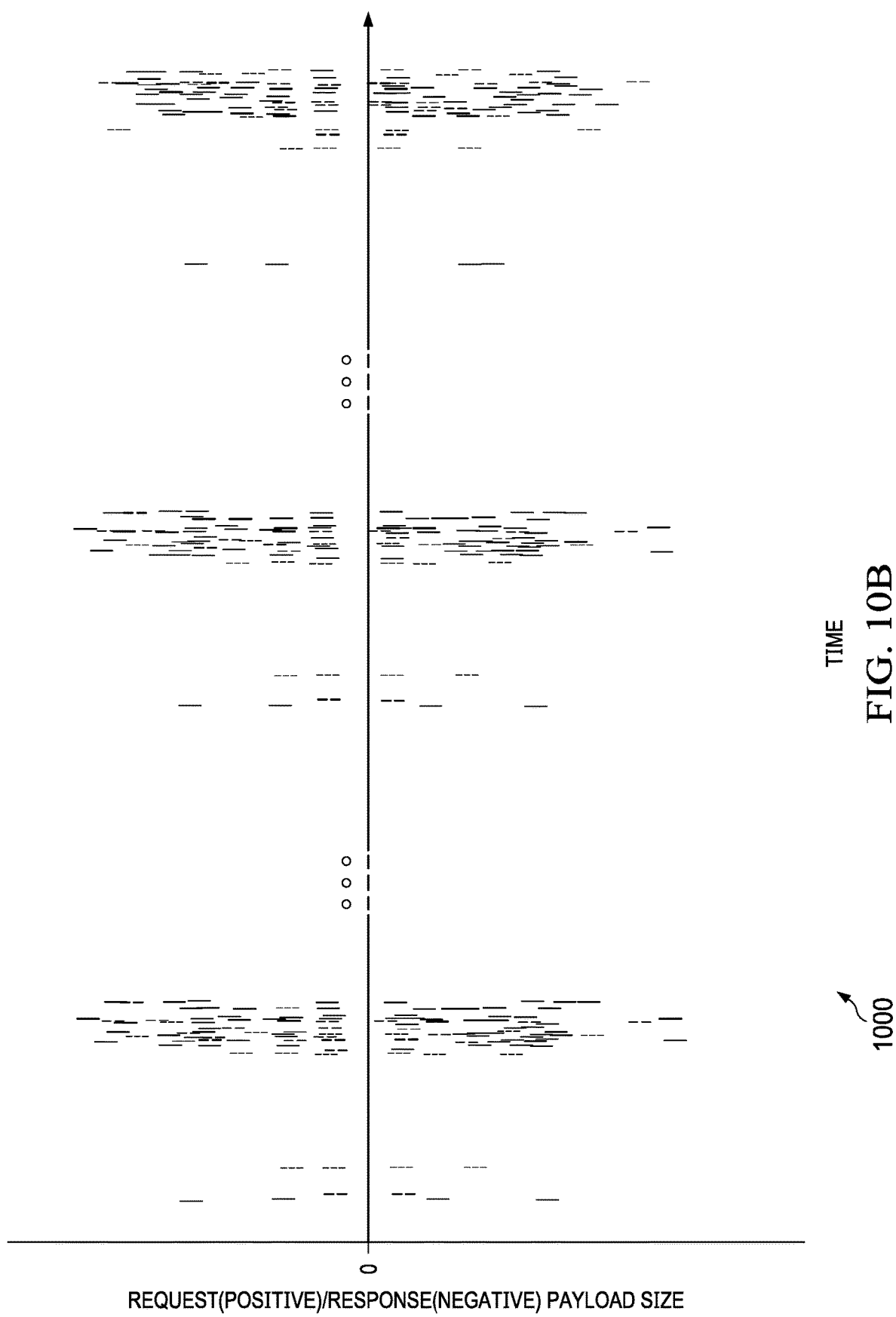

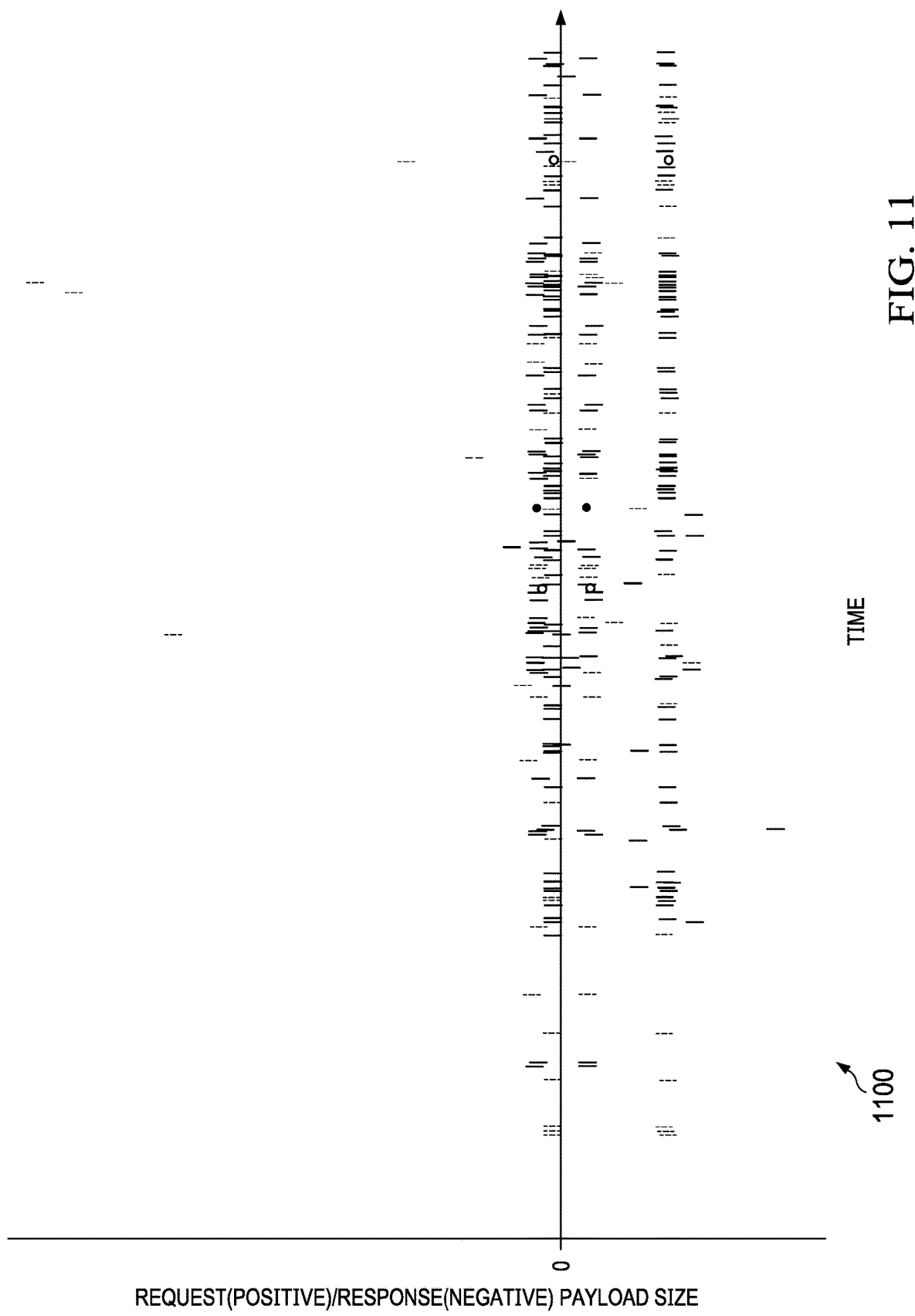

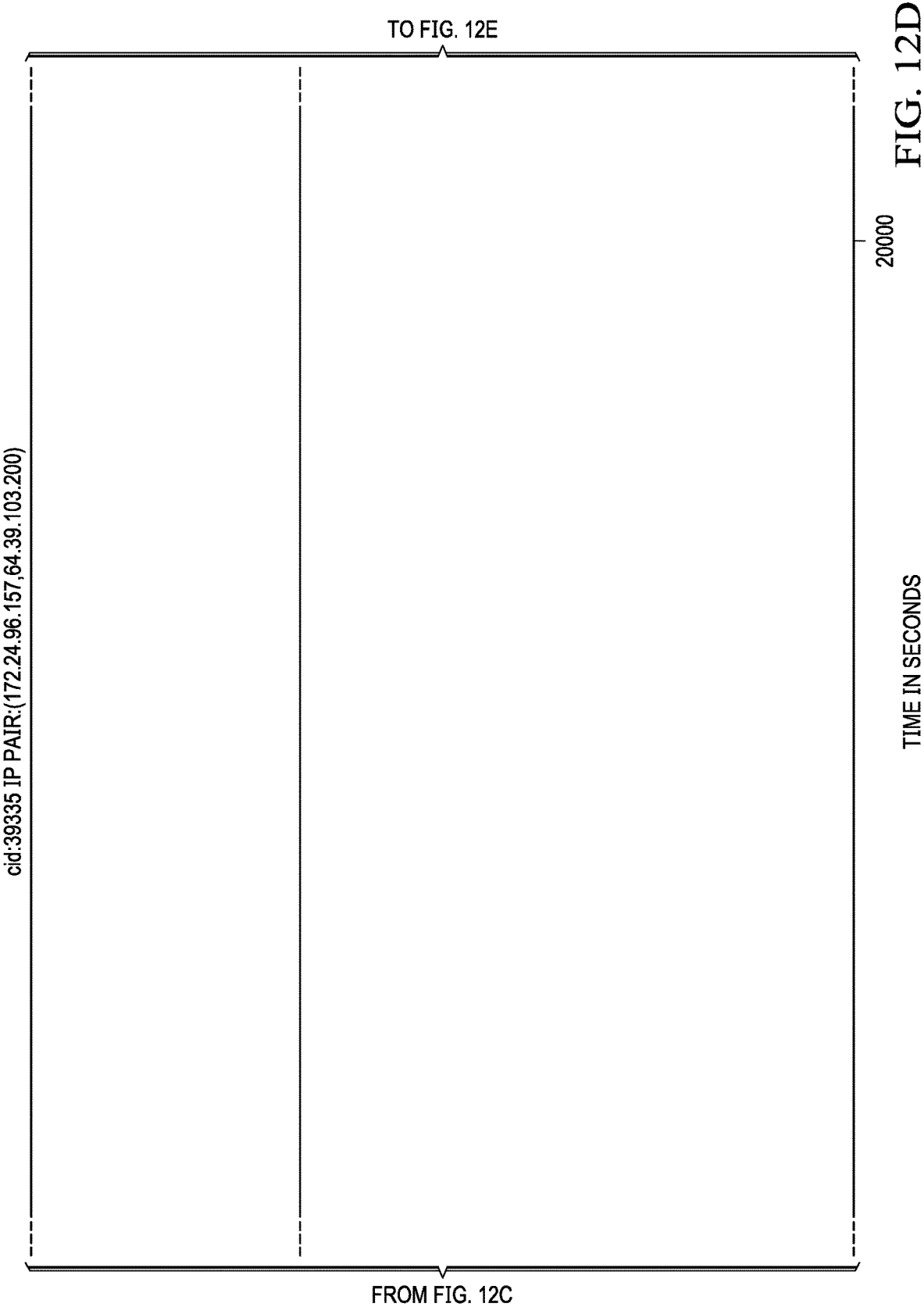

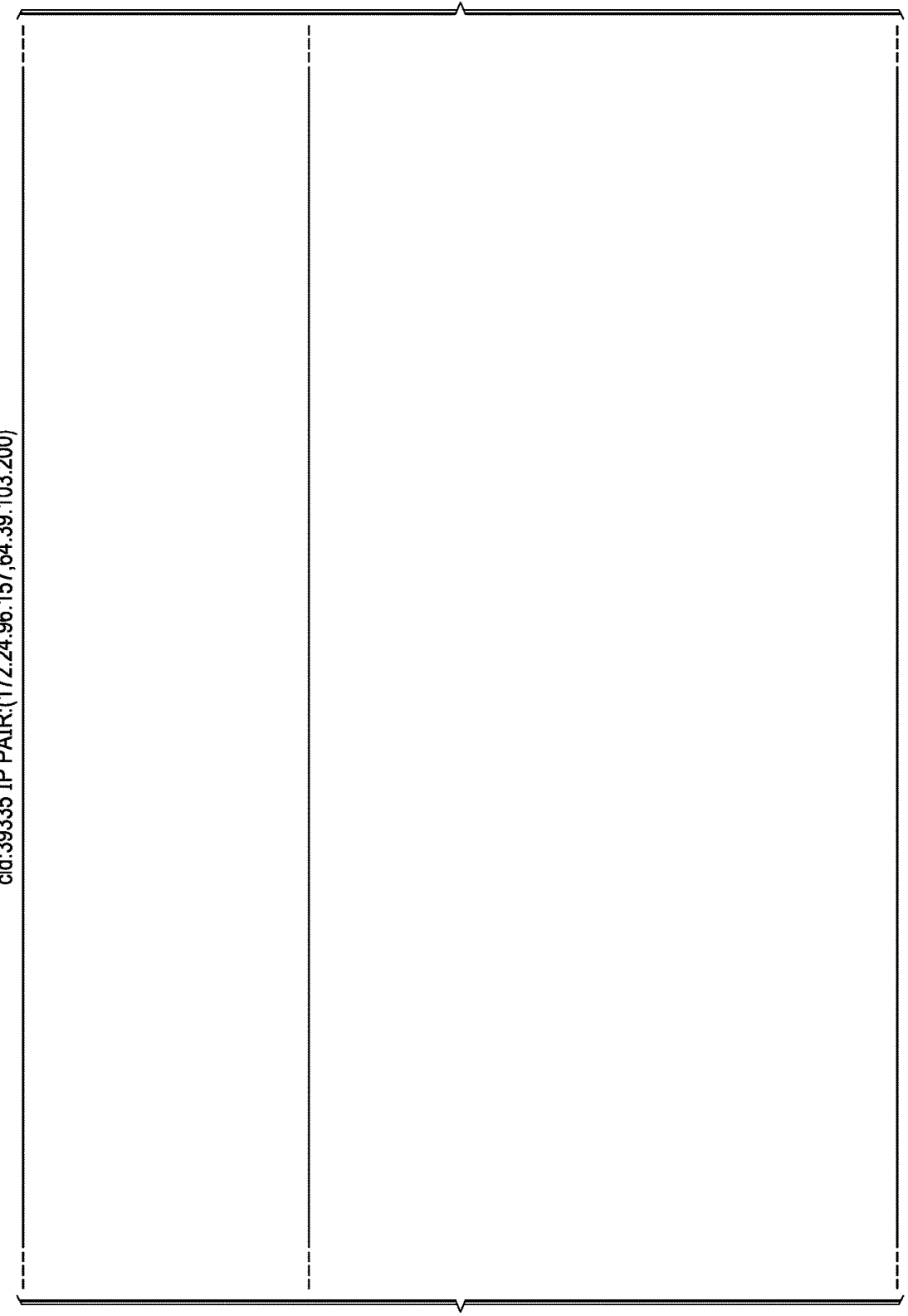

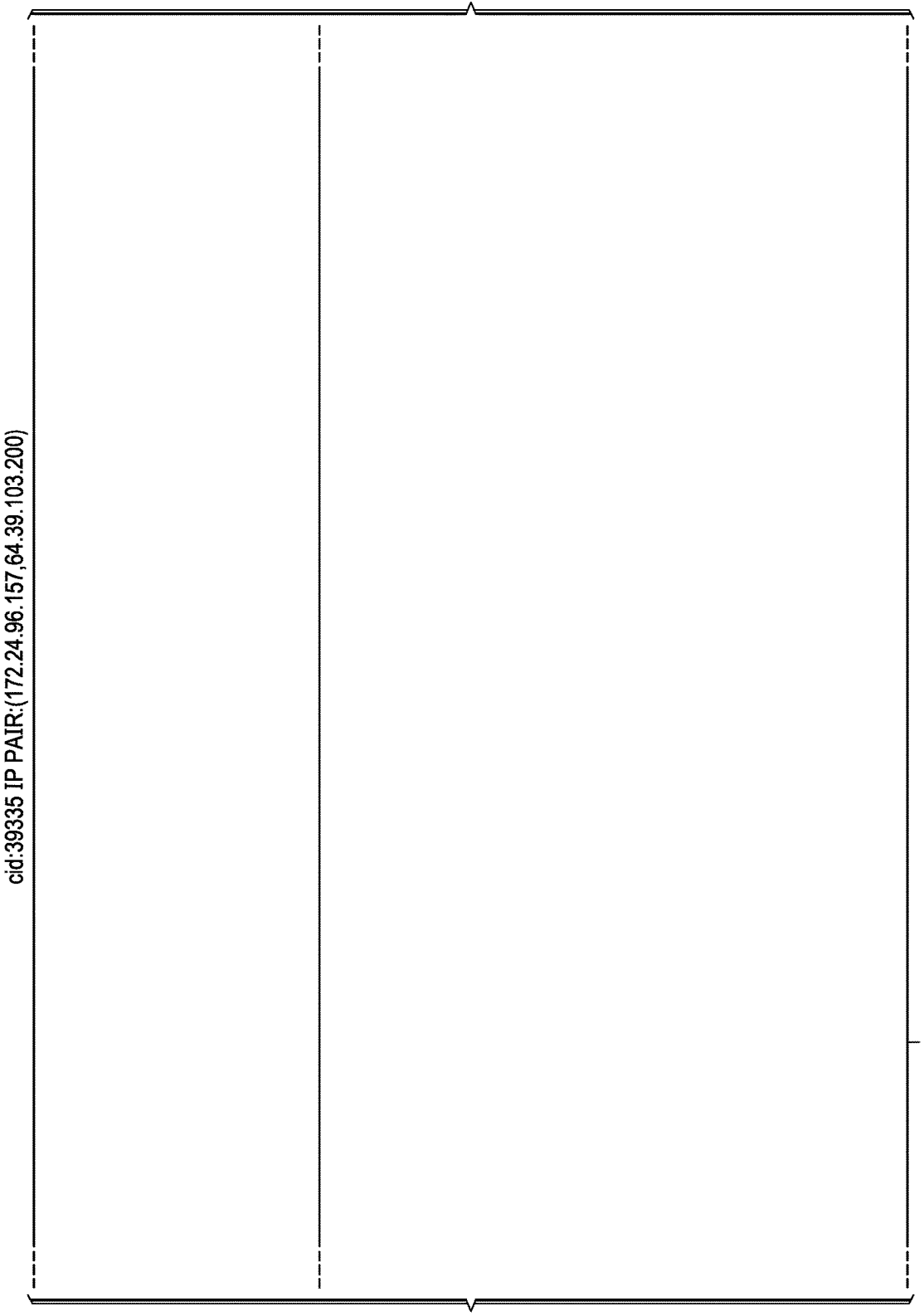

FROM FIG. 12F cid:39335 IP PAIR:(172.24.96.157,64.39.103.200)

40000
TIME IN SECONDS

FROM FIG. 12G cid:39335 IP PAIR:(172.24.96.157,64.39.103.200)

TIME IN SECONDS

50000

SYSTEMS AND METHODS FOR THREAT VISUALIZATION WITH SIGNATURE COMPOSURE, SPATIAL SCALE AND TEMPORAL EXPANSION

CROSS-REFERENCE TO RELATED APPLICATION(S)

This is a conversion of, and claims a benefit of priority from U.S. Provisional Application No. 62/424,974, filed Nov. 21, 2016, entitled "SYSTEMS AND METHODS FOR THREAT VISUALIZATION WITH SIGNATURE COMPOSURE, SPATIAL SCALE AND TEMPORAL EXPANSION," the entire disclosure of which is incorporated by reference herein for all purposes. This application relates to U.S. patent application Ser. No. 15/819,341, filed Nov. 21, 2017, entitled "SYSTEMS AND METHODS FOR ATTACKER TEMPORAL BEHAVIOR FINGERPRINTING AND GROUPING WITH SPECTRUM INTERPRETATION AND DEEP LEARNING," which is a conversion of, and claims a benefit of priority from U.S. Provisional Application No. 62/424,964, filed Nov. 21, 2016, entitled "SYSTEMS AND METHODS FOR ATTACKER TEMPORAL BEHAVIOR FINGERPRINTING AND GROUPING WITH SPECTRUM INTERPRETATION AND DEEP LEARNING," both of which are incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to network security. More particularly, embodiments disclosed herein relate to big data analytics and attack visualization by network security systems operating in a distributed computing environment. Even more particularly, embodiments disclosed herein related to network security systems, methods, and computer program products for threat visualization with signature composure, spatial scale, and temporal expansion.

BACKGROUND OF THE RELATED ART

In the field of network security, computerized tools are often used to prevent and monitor unauthorized access, misuse, modification, or denial of a computer network and network-accessible resources. A network intrusion detection system (NIDS) is an example of a computerized network security tool—which can be implemented as a networked device or software application—that monitors a network or systems for detecting malicious activity or policy violations. A network intrusion prevention system (NIPS) is another example of a computerized network security tool—which can be implemented as a networked device or software application—that aims to prevent such malicious activity or policy violations. These computerized network security tools are collectively referred to herein as network security systems.

Snort is an open source network security system that can, in different modes, read and display network packets on Internet Protocol (IP) networks (sniffing); log network packets (packet logging); and monitor and analyze network traffic (intrusion detection). Snort is known to those skilled in the network security art and thus is not further described herein for the sake of brevity.

A network security system such as Snort is generally programmed to detect certain events (referred to as Snort events) in a computer network monitored by the network security system and to send out security alerts to human network security analysts accordingly. A human network security analyst may review Snort event data that triggered a security alert and determine whether or not to escalate to the management of the computer network under monitoring. Given the massive amounts of Snort event data that may come through a network security system at any given time, as well as the improbability for human network security analysts to visualize all potential cyberattacks, there is room for innovations and improvement.

SUMMARY OF THE DISCLOSURE

When human network security analysts review Snort event data responsive to security alerts issued by, for instance, an intrusion detection system (IDS), they focus on the content in the Snort event data and rarely give any attention to temporal patterns that may exist in a Snort stream. Currently, there is no known solution to this problem. Recognizing that an attacker may have its own temporal behavior in sending out network traffic (e.g., some attacks seem to happen at around 7 PM every three to five days), an object of the invention is to model attacker behavior by fingerprinting its temporal behavior. In some embodiments, this object can be realized by collecting intervals of adjacent events and examining the distribution to identify Snort events with temporal patterns.

In some embodiments, an attacker temporal behavior fingerprinting method may comprise pre-processing a Snort temporal sequence between a unique source Internet Protocol (IP) address and a destination IP address to prepare data for spectral extraction, performing spectral extraction which generates a spectral vector, and transforming the spectral vector using deep learning (e.g., using a stacked autoencoder) to denoise and decorrelate. The output spectral vector represents an attacker's temporal pattern fingerprint. Attacker temporal pattern fingerprints thus generated can be further grouped, clustered, or otherwise analyzed to determine/predict attacker behavior for many useful network security applications.

However, multi-dimensional representations of such fingerprints are difficult for human network security analysts to visualize. Accordingly, a goal of this disclosure is to present the nature of the attacks, such as signature composure, request/response size, and temporal pattern, via a user-friendly visualization methodology to a human network security analyst to assist in the security attack decision making process. In embodiments disclosed herein, this goal can be achieved in a system that utilizes special visualization processing techniques to analyze massive amounts of Snort event data in a way that is user-friendly, efficient, and effective in providing security insight to human network security analysts. In some embodiments, to capture signature composure, scaled request/response size and temporal spacing relative to each conversation in the Snort event data in a unified way, the system may identify events with common characteristics such as signature identifiers (IDs), source network address (e.g., source IP address), and destination network address (e.g., target IP address). In this disclosure, a signature is a filter representation of malicious traffic. The system may extract and group these events by signature IDs and sort them by time marks. The sequential collection of Snort events (which may contain multiple signature IDs) for each pair of unique source IP address and destination IP address is considered a "conversation." Unlike machine-digestible attacker temporal behavior fingerprints, signature IDs are human-readable.

Concurrently or in parallel, the system may further process each conversation to gain additional security insight. For example, for each event in each conversation, the system may determine the request size and response size. To generate a visual representation such as a bar graph, the system may sort the events in the conversation by time marks in an ascending order, assign a unique visual clue (e.g., color, shape, shade, pattern, icon, etc.) to each unique signature, determine a height of a shape (e.g., a rectangle bar) relative to the number of occurrence of a Snort event, determine a positive scale (e.g., above an x-axis) relative to a request payload size, determine a negative scale (e.g., below the x-axis) relative to a response payload size, and plot the determined results along the x-axis representing a time period of interest for the conversation ("timeline"). The timeline for the conversation can be scaled/zoomed in and/or out for best pattern visibility.

Accordingly, in some embodiments, a network security system may operate to collect network security event data over a long period of time (e.g., eight months). A data mining operation may be performed, concurrently or in parallel, on the network security event data collected over the time period. The data mining operation may include extracting characteristics from the network security event data collected over the time period. The characteristics may include a computer network identifier, a source network address, and a destination network address which belongs to a computer network monitored by the network security system. The network security system may identify unique conversations in the network security event data between each unique pair of a source network address and a destination network address, utilizing the characteristics extracted from the network security event data collected over the time period. Each event in each unique conversation (or campaign) in the network security event data has an event time for indicating the time at which the event occurs in the unique conversation. The network security events in the unique conversation can optionally be sorted according to the event time for each event. The network security events are associated with signature identifiers that identify different types of attacks. Each unique signature is assigned with a unique visual clue (e.g., color, pattern, etc.). The network security system may operate to determine a particular character (e.g., size, height, etc.) of the unique visual clue to reflect a number of occurrences of a particular network security event and a spatial scale representation of payload sizes associated with the network security events. The network security system can generate a visual representation (visualization) relative to a conversation timeline for the time period for presentation on a user interface. The visualization can contain unique visual clues for the different types of attacks associated with the signature identifiers and the spatial scale representation of the payload sizes associated with the network security events associated with the signature identifiers.

In some embodiments, the visualization can be temporally scalable from months, weeks, days, hours, or minutes down to seconds and/or from seconds up to minutes, hours, days, weeks, or months. In some embodiments, for each network security event received by the network security system, the network security system is operable to extract a source network address from which the network security event is originated, a destination network address to which the network security event is destined, a computer network identifier associated with a computer network where the destination network address belongs, a time when the network security event occurs, a signature identifier identifying a type of attack associated with the network security event, a request size associated with a request from the source network address from which the network security event is originated, and a response size associated with a response from the designation network address. The information received (e.g., network security event data), determined, and generated by the network security system disclosed herein can be stored in a data storage accessible by the network security system.

The visualization methodology disclosed herein can provide many advantages. For instance, the timeline generated by the system for each conversation can allow a human network security analyst to quickly and effectively narrow down, from tens of thousands of events, to a single event indicating a possible security attack. Furthermore, the visualization methodology disclosed herein can have many practical applications, including, but are not limited to: identifying and modeling common attack patterns, anomaly detection, returning attacks identification, mixed attacks identification, etc.

One embodiment comprises a system comprising at least one processor and at least one non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

A more complete understanding of the invention and the advantages thereof may be acquired by referring to the following description, taken in conjunction with the accompanying drawings in which like reference numbers indicate like features and wherein:

FIG. 7-12J provide various case study examples of different threat visualizations with signature composure, spatial scale, and temporal expansion according to some embodiments disclosed herein;

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
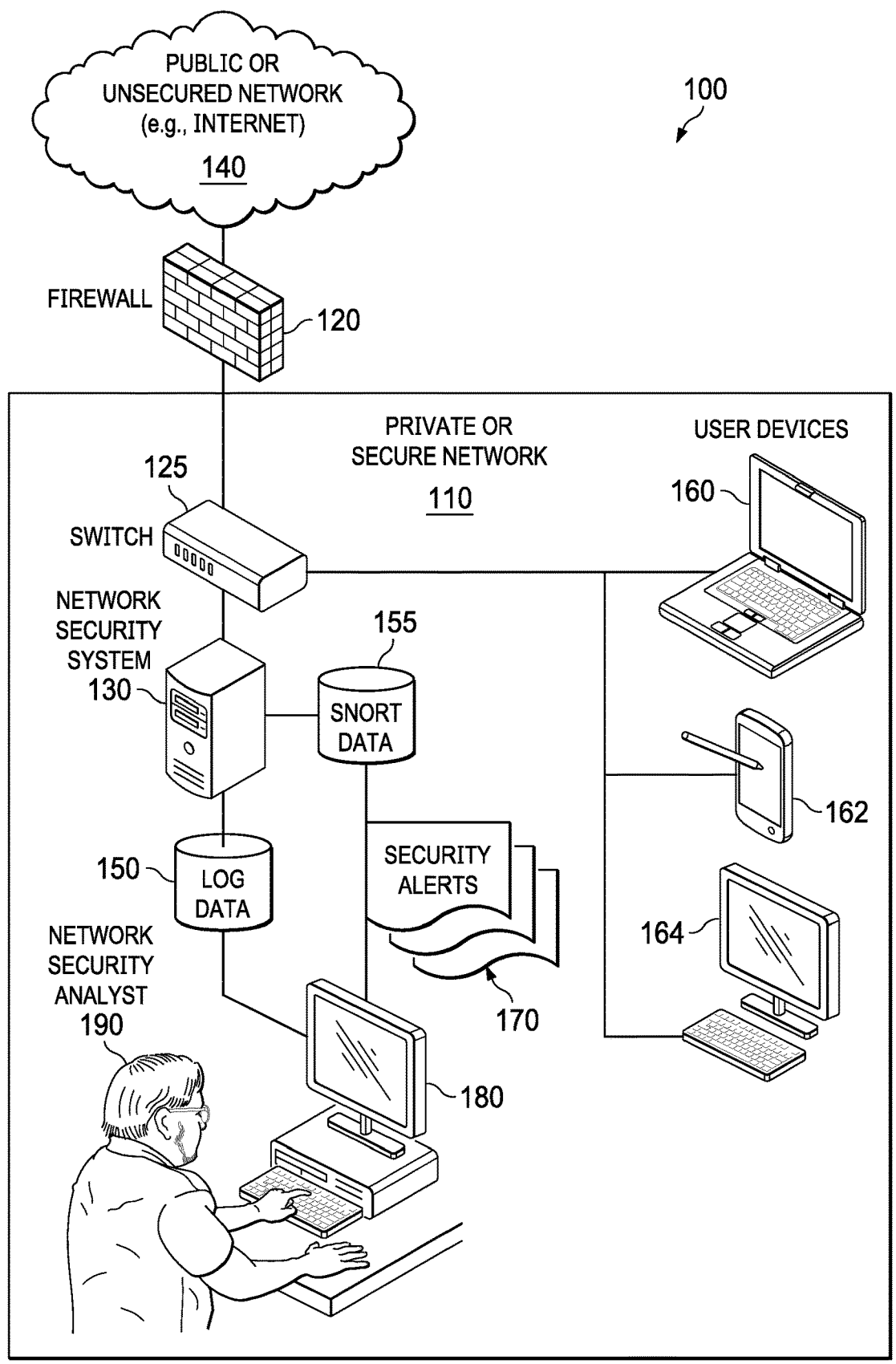
FIG. 1 depicts a diagrammatic representation of an example of a network security system operating in a network computing environment where embodiments disclosed here can be implemented.

FIG. 1 depicts a diagrammatic representation of one example of network security system 130 operating in private or secure network 110 that communicates with public or unsecured network (e.g., the Internet) 140 through firewall 120 in network computing environment 100. Network security system 130 may be communicatively connected to switch 125 behind firewall 120 to monitor network traffic to and from private network 110. As a non-limiting example, network security system 130 may be a Snort-based system as described above. Snort events in Snort data 155 can carry some security information/warnings (e.g., security alerts) 170. However, not all security alerts 170 may cause damage to assets 160 (e.g., server machine(s) 130, user devices 162, 164, 180, storage devices storing log data 150, Snort data 155, network device 125, software running on server machine(s) 130, and/or data 170) owned by an operator of private network 110. Accordingly, human network security analyst 190 may review security alerts 170, identify a true incident from the Snort events contained therein, and then escalate or report the true incident (e.g., to the operator of private network 110).

Since activities on a network can be collected in log messages, log data can provide the needed security context. However, to human network security analysts, this security context is lost or not possible to extrapolate. One reason is that log messages are unstructured. Moreover, networked computer systems may collect log messages for various reasons other than network security. For example, they may collect log messages for compliance reasons and no human review may be conducted on the collected log messages. Furthermore, log messages may have different time bases, data formats, data schemas, etc. and may be recorded asynchronously. Thus, it can be practically impossible for human network security analysts to try to differentiate, out of hundreds of millions of log messages between Internet Protocol (IP) or network addresses, activities that may reflect normal events being logged from activities that may be more malicious in nature, for instance, that may correlate to some kind of attack techniques. Unfortunately, because log messages are not considered as a data source for identifying possible attacks, no tools existing today that may indeed correlate collected (logged) events in log messages to provide the proper security context to IDS attacks identified by the IDSs.

Figure 2:
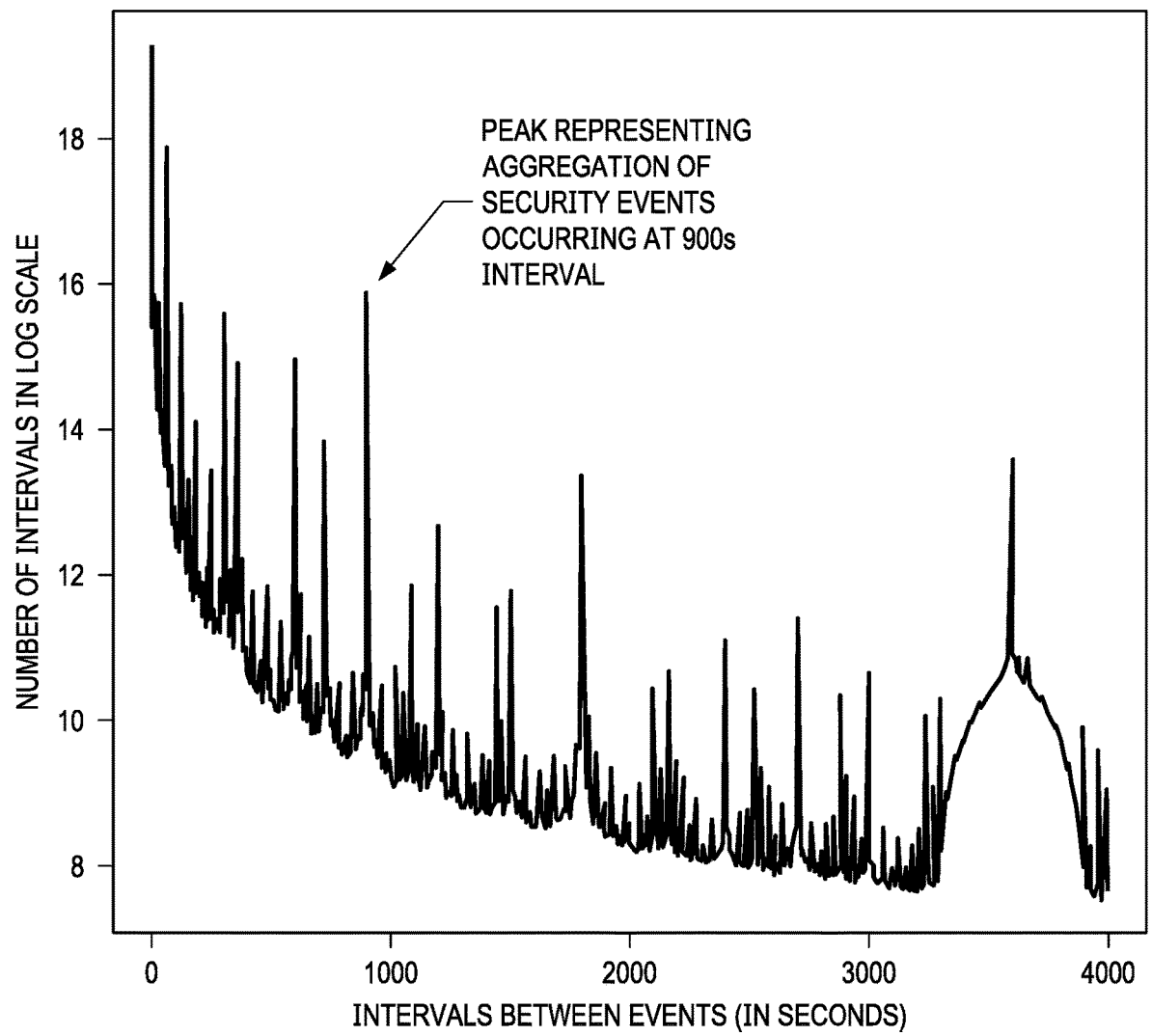
FIG. 2 depicts a plot diagram showing an example of a time sequence interval distribution of network activities.

FIG. 2 depicts a plot diagram showing an example of a snort event time sequence interval distributions of network activities revealing the existence of peaks occurring on varying time intervals. Some peaks can be explained by some system activities and some peaks are actually hacker/attacker activities that are obfuscated in some way to make them virtually undetectable by an IDS. Even though they may be obfuscated, such attacker activities behave in some kind of temporal pattern (e.g., repeat itself in several hours, over and over again, with noises in between activities). That is, a hacker or attacker may apply the same tool/routines to attack a network asset, a network device, a web site, or a computer network over time and may do the same to other web sites and/or computer networks.

To show the existence of periodicity in attack time sequences, here is an illustrative example explaining the generation of FIG. 2. Embodiments disclosed herein examine a big number of attacks by counting the number of adjacent event intervals in all the time sequence and record the relationship between such event interval counts (in log scale) to event interval (in seconds). FIG. 2 illustrates such a relationship. The peaks are indicating the event intervals that occurs significantly more than their neighbors.

As illustrated in the statistical distribution of FIG. 2, such attacker behaviors can be considered time-based with some periodicity (regular recurrences), although they may not be precisely periodical. By identifying the specific periodicity composition in a time domain diagram (FIG. 2), an attacker's temporal behavior pattern may also be identified. While FIG. 2 explains the problem space in an aggregated nature in detecting attacker activities, it does not reveal any individual attacks and thus is not used by human security specialists to study individual attacks. Further, temporal patterns rarely got presented to human security specialists as they do not review temporal sequences or time domain diagrams. Rather, they review the content of attacker activities. Thus, FIG. 2 suggests a new way of machine-oriented reviewing of security events.

As further explained below with reference to a new network security system, in some embodiments, each time domain temporal sequence is associated with a unique source IP address (which could represent a potential attacker) and a destination IP address (which could represent a potential victim of the attacker) is pre-processed to an aggregation time period (e.g., a warping window). The periodicity in the time sequence, which may be caused by the automation of an attack, can then be transformed to extract a spectral vector. The spectral vector can again be transformed using deep learning (which de-noises and de-correlates the spectral vector) to extract a fingerprint that identifies the attacker's unique temporal behavior.

Figure 3:
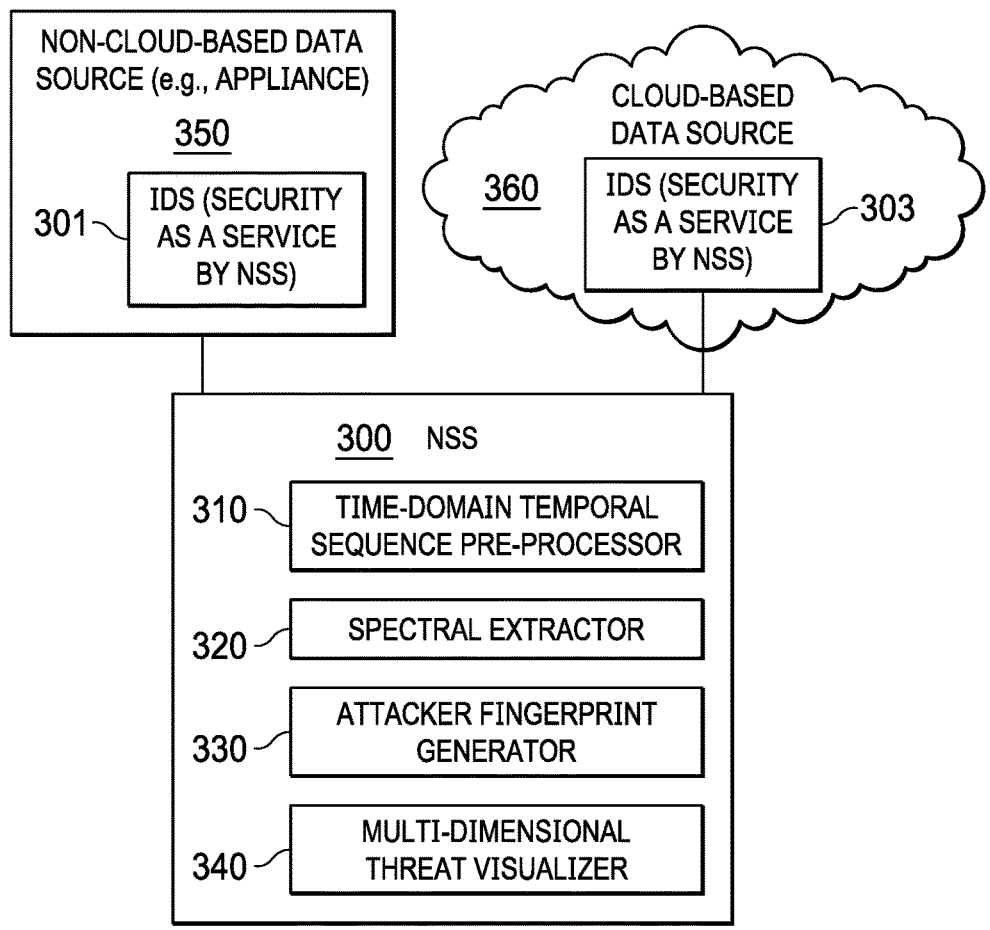
FIG. 3 depicts a diagrammatic representation of an example of a network security system providing intrusion detection services to cloud-based and non-cloud-based computing environments.

While FIG. 1 shows a network security system operating in a network computing environment that it monitors, other implementations are also possible. For instance, a network security system may reside outside of one or more network computing environments that it monitors. As illustrated in FIG. 3, network security system (NSS) server 300 (which can be executing on a server computer or multiple server machines) may operate to deliver intrusion detection service 301 to non-cloud-based computer 350 (e.g., an appliance installed on the premises of an enterprise) or intrusion detection service 303 to cloud-based computer 360 (e.g., a hosted server operating in a cloud computing environment).

As illustrated in FIG. 3, each IDS service provided by the NSS server can be configured to collect IDS event (raw) data from the respective computer network that it monitors and communicate the collected data to the NSS server as a Snort stream or sequence. A challenge faced by the NSS server and the like is that attackers may alter and/or evolve their attacking techniques and methods targeting different computer networks at different times. For example, the same attacker may use one software tool or method to attack one computer network and using another software tool or method to attack another computer network. Yet, most attackers utilize commonly available network exploitation (hacking) tools, such as an open source software tool like sqlmap, or their own scripts, such as a custom Python script. Sqlmap is an open source penetration testing tool that automates the process of detecting and exploiting several different types of SQL injection flaws and taking over of database servers. Python is a programming language. These and other network hacking tools and programming languages are known to those skilled in the network security art and thus are not further described herein.

One reason that attackers may feel comfortable in utilizing commonly available network hacking tools or custom scripts (collectively referred to herein as "tools") over and over again is that it is exhaustingly expensive for a network operator or owner to try to patch all potential network security vulnerabilities in view of all the possible attacks out there that are also constantly changing. A network security vulnerability in this disclosure may reflect a system susceptibility or flaw, attacker access to the flaw, and attacker capability to exploit the flaw. Indeed, the rate of evolution of an attacker's attack pattern and variables can be vastly faster than, and out paces an enterprise's ability to create and release a corresponding patch or patches. For example, a Trojan horse malware called Zeusbot or Zbot has existed since before July 2007 and still runs on versions of Microsoft Windows today. Using stealth techniques, Zeusbot is very good at hiding its tracks and, as such, is extremely difficult to detect even with up-to-date security software. Attacks by Zeusbot, SpyEye virus, and the like may be considered as significantly (e.g., 90%) unpreventable.

Because some network security vulnerabilities are extremely difficult to patch, they may be considered "unpatchable." It is not uncommon for attackers to try to take advantage of such "unpatchable" network security vulnerabilities using commonly available tools. Therefore, even though attackers may target different computer networks, there is a high likelihood that there may be similarities in the tools that they user and/or how they conduct the attacks using these tools. Some of these similarities may be too subtle and/or may elapse over a long period time that they become invisible to human network security analysts.

Historically, network security software or a security patch (i.e., a security update to the network security software) is content-based—examine network traffic content to find a known attack pattern (e.g., one that is known to attack a particular network security vulnerability). A drawback of this content-based approach is that attackers have many ways to evade detection and hide their tracks, leaving little trace behind.

To this end, embodiments disclosed herein take a different approach. Rather than trying to decipher the content in network traffic, embodiments of an intelligent network security system disclosed herein can learn the behavior of an attacker's tool (which could be automated) executing on a machine operating in a computer network monitored by the network security system over time, and the behavior of the machine when executing the tool, and transform the learned knowledge into a temporal behavior pattern that uniquely identifies an attacker. This process is referred to as attacker temporal behavior fingerprinting.

Spectral Transformation for Temporal Snort Sequence

Referring to the example shown in FIG. 3, in some embodiments, for any computer network monitored (e.g., through a network security service such as service 301 or service 303 shown in FIG. 3) by network security system ("NSS") 300, NSS 300 may include time-domain temporal sequence pre-processor 310 configured for applying special signal processing techniques to pre-process activities aggregated in a time sequence which could indicate a temporal behavior pattern of an attack between a source IP address and a destination IP address. NSS 300 may further include spectral extractor 320 for extracting a spectral vector and attacker fingerprint generator 330 for transforming the spectral vector into an attacker temporal behavior fingerprint (also referred to herein as a spectral fingerprint or an attacker fingerprint). Time-domain temporal sequence pre-processor 310, spectral extractor 320, and attacker fingerprint generator 330 will now be explained in detail below. In some embodiments, NSS 300 may utilize attacker temporal behavior fingerprints thus generated to perform attacks grouping for various purposes.

Figure 4:
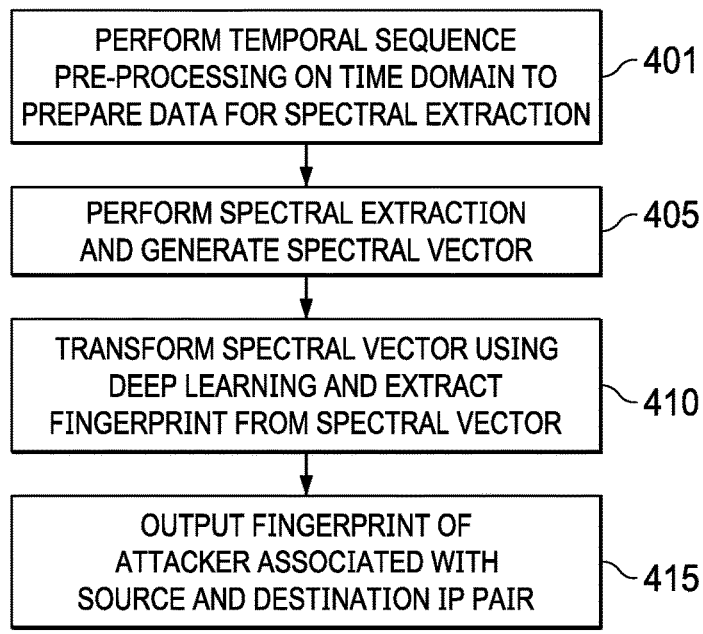
FIG. 4 depicts a flow diagram illustrating one example of an attacker temporal behavior fingerprinting method according to some embodiments disclosed herein.

In some embodiments, time-domain temporal sequence pre-processor 310 of NSS 300 may be particularly configured for pre-processing raw network traffic data (e.g., a time sequence of network activities) in preparation for spectral transformation by spectral extractor 320 to generate a spectral vector. Referring to FIG. 4, in some embodiments, this pre-processing process (401) may comprise collecting a Snort sequence between a unique pair of a source IP address and a destination IP address.

In some embodiments, the collection may be done over a long time sequence (e.g., six months). In some embodiments, the pre-processing process may further comprise processing the collected Snort sequence into internal representations (internal to NSS 300) referred to as NSS packets. Specifically, the processing may entail keeping only the time marks relative to events in the Snort sequence.

As an example, this may result in the following initial temporal sequence:

$s(0), s(1), \ldots, s(t) \ldots$ where t refers to time on the millisecond (ms) scale. Each $s(t)$ represents number of NSS packet at time t.

For the time point that no Snort event is triggered, the corresponding $s(t)$ is zero. For the time point with multiple events, $s(t)$ is the sum of those events. For example:

| Time s(t): | #number of events (on each time) |
|---|---|
| 0 | 1 |
| 1 | 0 |
| 2 | 9 |
| 3 | 4 events fired |

If no event is fired, s(t)=0. When at least one event is fired, s(t) is the # of events. That is, if any event is fired at a time point s(t), then s(t) represents whatever the number of events fired at that time point.

In some embodiments, time-domain temporal sequence pre-processor 310 may next apply a binning function to the initial temporal sequence, setting the bins (which represent windows in time) at 100 ms, for instance. Other time scales for this temporal aggregation can also be used, depending upon the granularity desired. In some embodiments, time-domain temporal sequence pre-processor 310 may then sum all events in each time window (bin). This results in the following binned temporal sequence:

sb(0), sb(1) . . . sb(i) . . .

where subscript i refers to the number of events found in each unit of 100 ms. Each sb(i) represents another type of NSS packet.

Note that while "s" refers to "sequence" and "sb" refers to "sequence bin" in this example, other variable names may also be used for the time windows. Thus, these variable names are meant to be non-limiting examples.

In some embodiments, time-domain temporal sequence pre-processor 310 may then apply a time warping window (WB) to the binned temporal sequence where WB=2^24 (16777216), essentially selecting a specific period of time (which, in this non-limiting example, is a little over 19 days) for further analysis. Other WB values may also be possible. For events captured beyond this window of time, they can be warped into this window by performing an operation as follows:

$$sbf(i)=sb(i)+sb(i+WB)+sb(i+2WB) \ldots$$

This results in a Fourier Transform-ready binned temporal sequence (sbf) having an aggregation of time warping windows (e.g., from day 0 to day 19, day 19 to day 38, etc.).

Once the internal data (in this case, a Fourier Transform-ready binned temporal sequence) is prepared, spectral transformation is performed to extract a spectral vector (405). In performing spectral transformation, in some embodiments, spectral extractor 320 may output F(I) by applying Fourier Transform to the Fourier Transform-ready binned temporal sequence (sbf) with a time warping window (WB) as follows:

$$F(I)=\text{FourierTransform}(sbf)$$

Fourier Transform has been widely used in signal processing to capture periodicity in a temporal sequence. Fourier Transform decomposes a function of time into the frequencies that make it up (transforming from one domain to another, for instance, from the time domain to the frequency domain). It can transform the periodicity in a temporal sequence into spikes (peaks) in the spectral domain. However, Fourier Transform has not been known to be used in the network security field. Some embodiments of spectral extractor 320 disclosed herein may include a custom Discrete Fast Fourier Transform function particularly configured for computing the discrete Fourier Transform of the Fourier Transform-ready binned temporal sequence. Fast Fourier Transforms are known to those skilled in the art and thus are not further described herein.

Skilled artisans understand that this Fourier Transform output (F(I)) contains a subset collection of peaks at the frequencies that appear at the inverse of the peak intervals (see, e.g., FIG. 2). These are referred to as spectral components.

In some embodiments, spectral extractor 320 may further perform a spectral squared sum aggregation on F(I) with a window size (WA) to get an aggregated Fourier Transform output FA(I) where:

$$FA(I)=\text{sqrt}(|F(I*WA)|^2+|F(I*WA+1)|^2+\ldots+|F(I*WA+WA-1)|^2)$$

The window size, in this case, represents a predetermined number of spectral components. As an example, WA=8192 spectral components. That is, in this example, spectral extractor 320 may aggregate about every set of 8K spectral components together and take a square root of the sum of sets of the spectral components. After performing sequence generation (which results in an initial temporal sequence s(t)), sequence binning (which results in a binned temporal sequence sb(i)), time warping (which results in a Fourier Transform-ready binned temporal sequence (sbf)), Fourier Transform (which results in a Fourier Transform output F(I)), and spectrum aggregation (which results in an aggregated Fourier Transform output FA(I)) on a very long time sequence, a spectral vector having a vector size of 1024 (i.e., each one-dimensional vector i of the multi-dimensional spectral vector has a 1024 floating point number) can be obtained (where FA(I) can be a mathematical representation of a spectral vector).

The spectral vector is transformed again (410) by attacker fingerprint generator 330 using a deep learning method to generate an attacker temporal behavior fingerprint for output (415). This is further described below. This output is specific to the unique pair of a source network address and a destination network address of the time sequence under examination.

Attacker Temporal Behavior Fingerprint Extraction

The spectral vector contains a huge amount of information (data points), some of which may not be indicative of an attacker's temporal behavior pattern. Thus, to extract a temporal pattern that may be uniquely identifying an attacker's temporal behavior with respect to a particular victim (which, in this case, is represented by the destination IP address), in some embodiments, the spectral vector is denoised and decorrelated. In some embodiments, to denoise and decorrelate the spectral vector so as to identify an attacker's temporal behavior with respect to a particular victim, attacker fingerprint generator 330 of NSS 300 may leverage a particular deep learning method.

Deep learning is a new field of machine learning which, in turn, is part of the field of artificial intelligence. Generally, deep learning is based on a set of algorithms that model high level abstractions in data by using a deep graph with multiple processing layers composed of linear and non-linear transformations. As discussed in the above-referenced U.S. patent application Ser. No. 15/819,341, filed Nov. 21, 2017, entitled "SYSTEMS AND METHODS FOR ATTACKER TEMPORAL BEHAVIOR FINGERPRINTING AND GROUPING WITH SPECTRUM INTERPRETATION AND DEEP LEARNING," there are a number of deep learning architectures. Under each deep learning architecture, there are a huge number of variants. It is not always possible to compare the performance of multiple architectures all together, because they are not all evaluated on the same data sets and are used for vastly different purposes.

Referring to FIG. 4, in some embodiments, then, time-domain temporal sequence pre-processor 310 can process time marks and events in a time sequence (e.g., a Snort sequence) involving a particular source network address and a particular destination network address monitored by NSS 300 to generate input (e.g., a Fourier Transform-ready binned temporal sequence (sbf)) for spectral extractor 320 (401). In turn, spectral extractor 320 can transform the Fourier Transform-ready binned temporal sequence (which represents signals in the time domain) from the time domain to the frequency domain to capture the periodicity in the Snort sequence into a spectral vector that may represent an attacker's temporal behavior pattern with respect to a particular destination IP address (405). Once the periodicity is captured in the spectral vector as described above, the spectral vector is transformed again using deep learning (410). In some embodiments, attacker fingerprint generator 330 of NSS 300 may leverage a stacked autoencoder to denoise and decorrelate the spectral vector to generate an attacker temporal behavior fingerprint (415). Stacked autoencoders are known to those skilled in the art and thus are not further described herein.

In some embodiments, attacker fingerprint generator 330 of NSS 300 may further comprise a deep learning engine or module particular configured for performing deep learning utilizing a stacked autoencoder. The deep learning module may operate to train the stacked autoencoder with particular parameters. In some embodiments, the stacked autoencoder is trained by the deep learning module through a layer-wise back-propagation algorithm (which looks for the minimum of the mean squared reconstruction error) with a machine learning library (e.g., Pylearn2, TensorFlow, Deeplearning4j, etc.).

As a non-limiting example, key parameters for training a stacked autoencoder may include the following:
Activation function: tanh (a known non-linear function)
Learning rate: 1e-3
Costs: Mean squared reconstruction error
Exponential decay factor: 1.000001
Minimum learning rate: 0.000001

An example of an NSS implementation having a suitable deep learning module can be found in the above-referenced U.S. patent application Ser. No. 15/819,341, filed Nov. 21, 2017, entitled "SYSTEMS AND METHODS FOR ATTACKER TEMPORAL BEHAVIOR FINGERPRINTING AND GROUPING WITH SPECTRUM INTERPRETATION AND DEEP LEARNING."

A spectral vector thus denoised and decorrelated by the stacked autoencoder is referred to as a fingerprint vector or a spectral fingerprint. In this example, the spectral fingerprint has a vector size of 10. The 10 floating point numbers represent a unique mathematical description of a temporal Snort event sequence (i.e., the 10 floating point numbers are a 10-dimensional representation with a strong distinguishing capability as a fingerprint). Such a numeric vector is not meant for human to interpret or understand. It is a machine-digestible vector for differentiating different attack patterns. Each spectral fingerprint can be stored (e.g., in a data storage accessible by NSS 300) with its associated computer network identifier, source network address, destination network address, time of event, signature identifier, request size, and response size as part of an "attack campaign." As explained below, the stored campaign information can be used in generating visualizations for presentation to users (e.g., network security analysts) on their devices.

Each spectral fingerprint represents a unique attacker temporal behavior pattern (and hence is also referred to as an attacker fingerprint or an attacker's temporal behavior fingerprint) representing a particular "conversation" (which may include different attacks) between a particular source IP address and a particular destination IP address over a period of time. However, multi-dimensional representations are difficult for human network security analysts to visualize. Accordingly, special visualization processing techniques may be needed in determining and generating a comprehensive, unified visualization to present spectral fingerprints in a way that is user-friendly, efficient, and effective in providing security insight to human network security analysts. An example visualization scheme that can address this need and more is described below with reference to FIGS. 5 and 6. In some embodiments, NSS 300 may further comprise multi-dimensional threat visualizer 340 implementing a visualization scheme disclosed herein.

Figure 5:
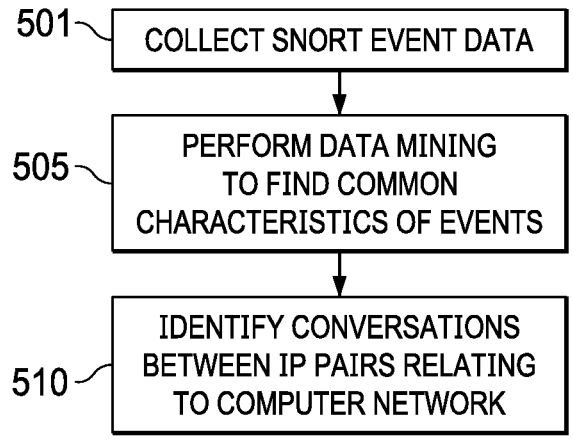
FIG. 5 depicts a flow diagram illustrating one example of a method for threat visualization with signature composure, spatial scale, and temporal expansion according to some embodiments disclosed herein.

Referring to FIG. 5, a method for threat visualization with signature composure, spatial scale, and temporal expansion may generally comprise collecting network security event data (e.g., Snort event data) for a long duration of an attack history (e.g., eight months) (501), performing a data mining operation (explained below) on the collected Snort event data to find events that have common characteristics to one another (e.g., computer network ID, source IP address, and destination IP address) (505), and identifying conversations between each unique pair of a source IP address and a destination IP address in a particular computer network monitored by the system (510).

As discussed above, Snort is a network intrusion prevention system that captures certain pre-defined pattern in network traffic. Such traffic often consists of a series of request and response content. These contents are stored physically into a packet and transmitted to a data center for further analyst's investigation. Due to the tremendous amount of network traffic and computer networks serviced by a Snort system, the amount of data to be processed by a Snort system is usually massively large. For example, 1.2 billion Snort events may be collected in only eight months.

Thus, it can be a challenge to just transfer, store, and query those data. Making this challenge even more impossible is the fact that a single network attack can often run for a very long period of time. Another big challenge is that all the events are mixed together as they arrive in a security analysis operation. In order to study and examine such a behavior, the system would need to isolate and extract a long duration of attack history, retrieve traffics from massive amounts of data, and analyze them in a fast, efficient, and accurate manner.

To address these technical issues, in some embodiments, the system advantageously leverages big data processing platforms such as Hadoop and Spark. Apache Hadoop is an open-source software framework for distributed storage and distributed processing of very large data sets on computer clusters built from already-available computing components for parallel computing. Apache Spark is an open source cluster computing framework that provides an interface for programming entire clusters with implicit data parallelism and fault-tolerance features. Hadoop and Spark are known to those skilled in the art and thus are not further described herein.

In some embodiments, for each Snort packet received by the system, the following information is extracted:
cid—computer network ID
srcIP—Source IP address
dstIP—Destination IP address
tm—UTC time when such event occurs
sid—Signature ID indicating the type of this signature qSz—Request Size
pSz—Response Size In some embodiments, (cid, srcIP, dstIP) can serve as keys for finding unique conversations in the Snort event data, each per a pair of a source IP address and a destination IP address in a computer network (per cid, srcIP, and dstIP) under monitoring by the system. Utilizing Hadoop's distributed storage and Spark's parallel processing technique, these pieces of information can be mined from the Snort event data and used to generate a time-sorted sequence, in an ascending order, as: (tm, sid, qSz, pSz). In some embodiments, the list of information (tm, sid, qSz, pSz) for a conversation (cid, srcIP, dstIP) may be referred to as a "campaign" for that conversation. (To this end, the time-sorted sequence may also be referred to as a "conversation timeline.") The data mining operation described above may run continuously, on demand, or periodically.

Figure 6:
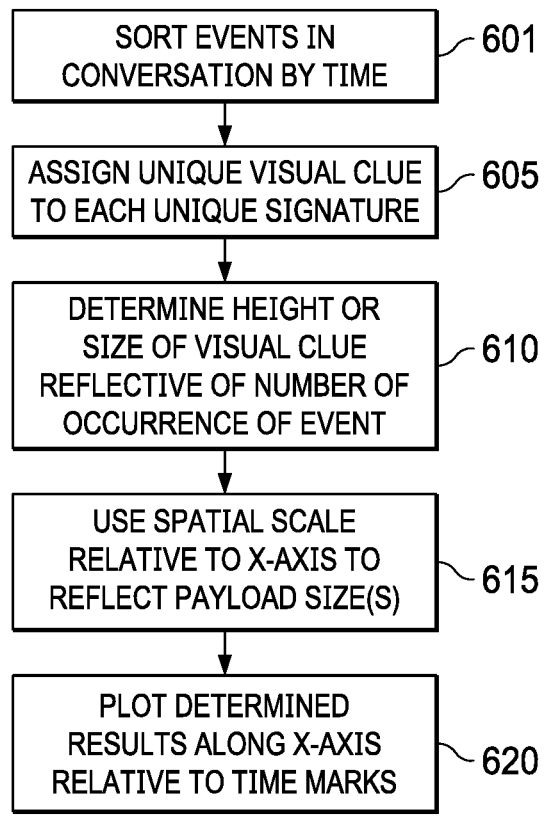
FIG. 6 depicts a flow diagram illustrating one example of a visualization scheme that discloses security insight using snort signature composure, spatial scale, and temporal expansion according to some embodiments disclosed herein.

Referring to FIG. 6, a new visualization scheme that discloses security insight relative to a conversation timeline using Snort signature composure, spatial scale, and temporal expansion may comprise the following steps.

Step 601. Sort events in a conversation according to tm in ascending order.

Step 605. Identify each unique signature with a unique visual clue (e.g., a rectangle bar, line, or icon) and using a "rainbow" method to assign color or pattern to each unique visual clue to the maximum color/pattern contrast. For example, if there are 10 events (with 10 different signature IDs) hi a conversation, they may be assigned 10 different colors or patterns based on a spectral assignment method that reflects different security meanings (e.g., green or solid line may indicate a generally harmless activity, while red or dotted line may indicate an extremely likely high risk attack, with other colors/patterns such as yellow, orange, etc, indicating security risks somewhere in-between). In some embodiments, the spectral scale may correspond to an asset risk/damage model of a particular computer network, an example of which can be found in U.S. patent application Ser. No. 15/819,376, filed Nov. 21, 2017, entitled "SYSTEMS AND METHODS FOR LOG AND SNORT SYNCHRONIZED THREAT DETECTION," which is fully incorporated by reference herein.

Step 610. Determine the character (e.g., a height or size) of the visual clue to reflect the number of occurrences of a particular Snort event. For example, if a bar shape or line is used to represent a unique visual clue, then the height of the bar or line would be reflective of the number of occurrences of a corresponding Snort event.

Step 615. Determine a visual representation (e.g., a spatial scale relative to an X-axis) to reflect the payload sizes associated with the Snort events. For example, the scale above X-axis can be used to describe the request payload size, while the scale below the X-axis can be used to describe the response payload size.

Step 620. Plot the results determined from the previous steps relative to time along the X-axis, applying appropriate scale for the best pattern visibility.

As a specific example, each vertical bar has a color or pattern that represents a unique signature ID and a location that represents either the request payload size or the response payload size. Plotting these visual clues (e.g., bars) over a span of time (which, in some embodiments, is referred to as a "conversation timeline") provides a visual insight that is immediate and effective. Depending upon the capability of a viewer running on a user device, the temporal expansion of a conversation timeline can be a few minutes to hours, days, weeks, or even months. Furthermore, a human network security analyst, interacting with the conversation timeline thus generated by the system, can zoom in to view details of the events or zoom out to view the temporal behavior pattern(s) identified by the system as attacker spectral signature(s). In some embodiments, a default setting for viewing and/or zooming may be provided. In some embodiments, the default setting may be user-adjustable.

Additionally or alternatively, different shapes (such as a dot), gradients, shades, icons, etc. may be used to show attack signatures for different security attack categories—such as SQLI versus cross-site scripting.

Embodiments of the unique visualization scheme described above with reference to FIG. 6 can run asynchronously, concurrently, or in parallel with the data mining method of FIG. 5.

In this way, the massive amounts of Snort event data can now be visualized in a meaningful, detailed, and scalable way in a single view that allows an analyst to quickly pinpoint a threat. For example, attackers may enumerate through errors to discover database vulnerabilities (referred to as database enumeration). So, the payload sizes may be different. However, even though the content is changed, the temporal behavior pattern is the same. This kind of attack can be isolated from tens of thousands of events very quickly using the conversation timeline. As another example, a human network security analyst will notice a big payload change (which can be an indication of a compromise) before the color change (which likely is an indication of a database enumeration attack) and can quickly determine that perhaps exfiltration is the only possible explanation.

FIGS. 7-12J provide examples of case studies, illustrating numerous benefits provided by embodiments disclosed herein that will greatly improve the security analyst efficiency and also provide more security insights. These case study examples are as follow:

Advantage Case I: Identify Suspicious Event Quickly

Figure 7:
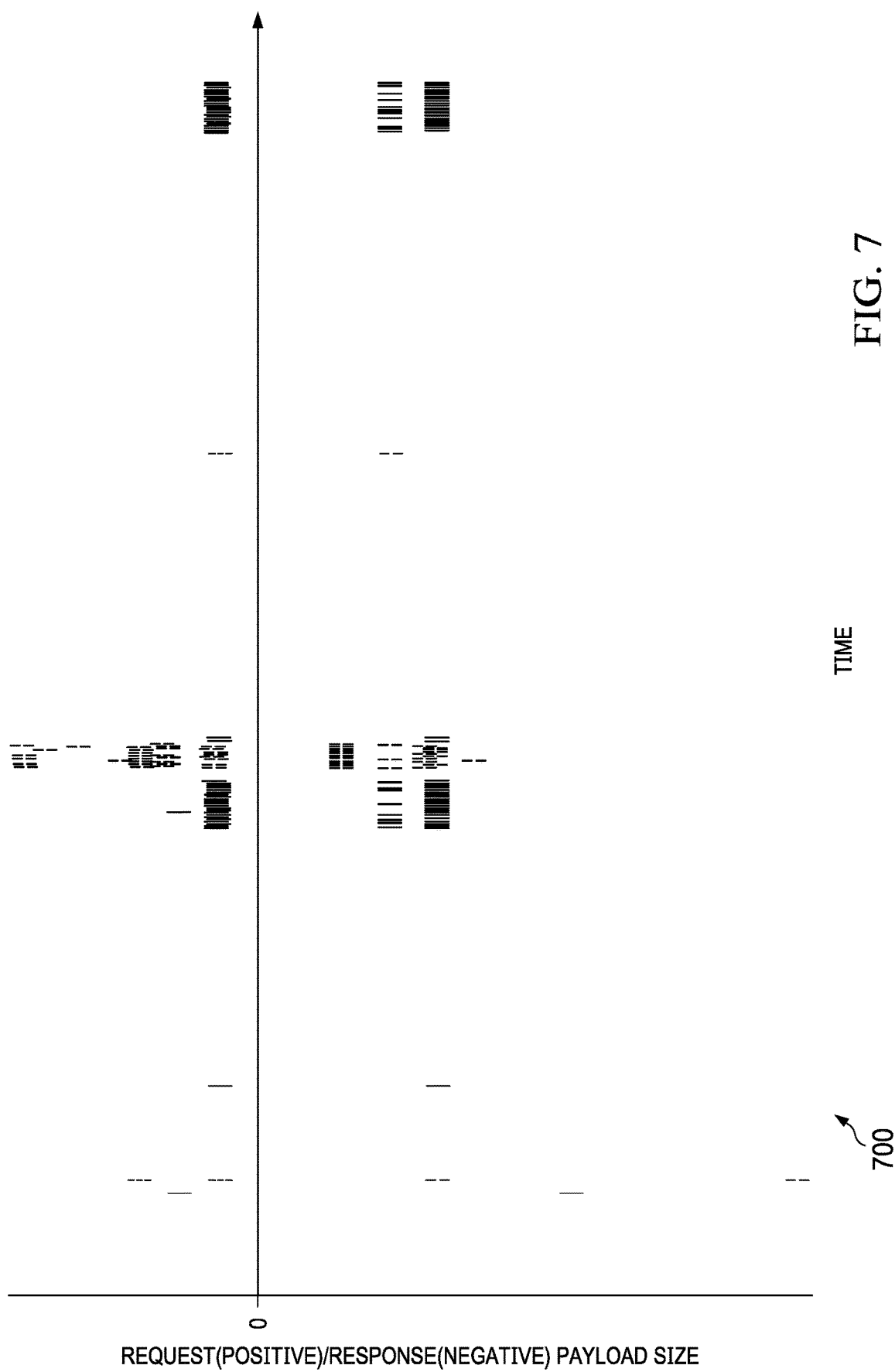

FIG. 7 depicts a plot diagram illustrating an example of a conversation timeline.

Specifically, as detected and visualized by a network security system disclosed herein over a period of time according to some embodiments disclosed herein, conversation timeline 700 shows an example of an attack where the majority of the events are concentrated on a few dense areas. A user (e.g., a network security analyst or specialist) could choose an appropriate response strategy by quickly viewing a sample in a concentrated area or skipping ahead. This allows the user to quickly identify any suspicious event that they would like to further investigate and focus the majority of their time on the sporadically located events.

Advantage Case II: Identify and Model Attack Patterns

Figure 8B:
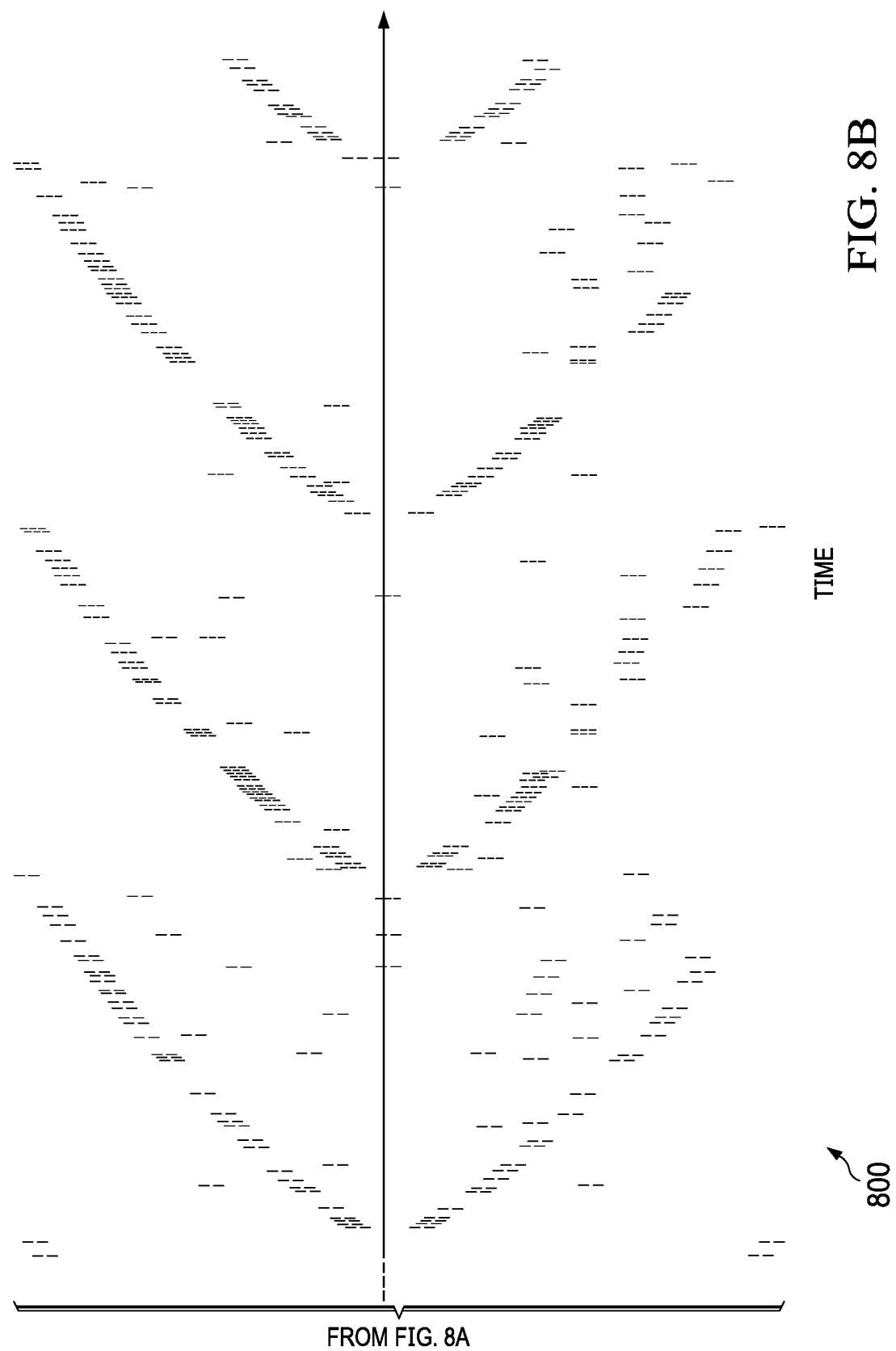

As discussed above, a conversation timeline may cover a lengthy period of time (e.g., eight months) that the system has to track. Sometimes an attack may not be detectable in a short amount of time (e.g., hours, days, or weeks), but, with the invention disclosed herein, may be detectable in the long run. This is illustrated in FIGS. 8A-8B in which a strong temporal behavior pattern could be first identified relative to conversation timeline 800 where a SQL injection column enumeration is happening (FIG. 8A, corresponding to signature ID 34087). A network security analyst could rely on the signature type and the temporal behavior pattern to understand the nature of the attack. In later stage of the attack, a different signature is identified (FIG. 8B, corresponding to signature ID 45129). Such a change is hard to detect without this invention since the amount of events are very big and network security analysts normally have very limited time to understand and deal with incidents.

Advantage Case III: Anomaly Detection

Figure 9:
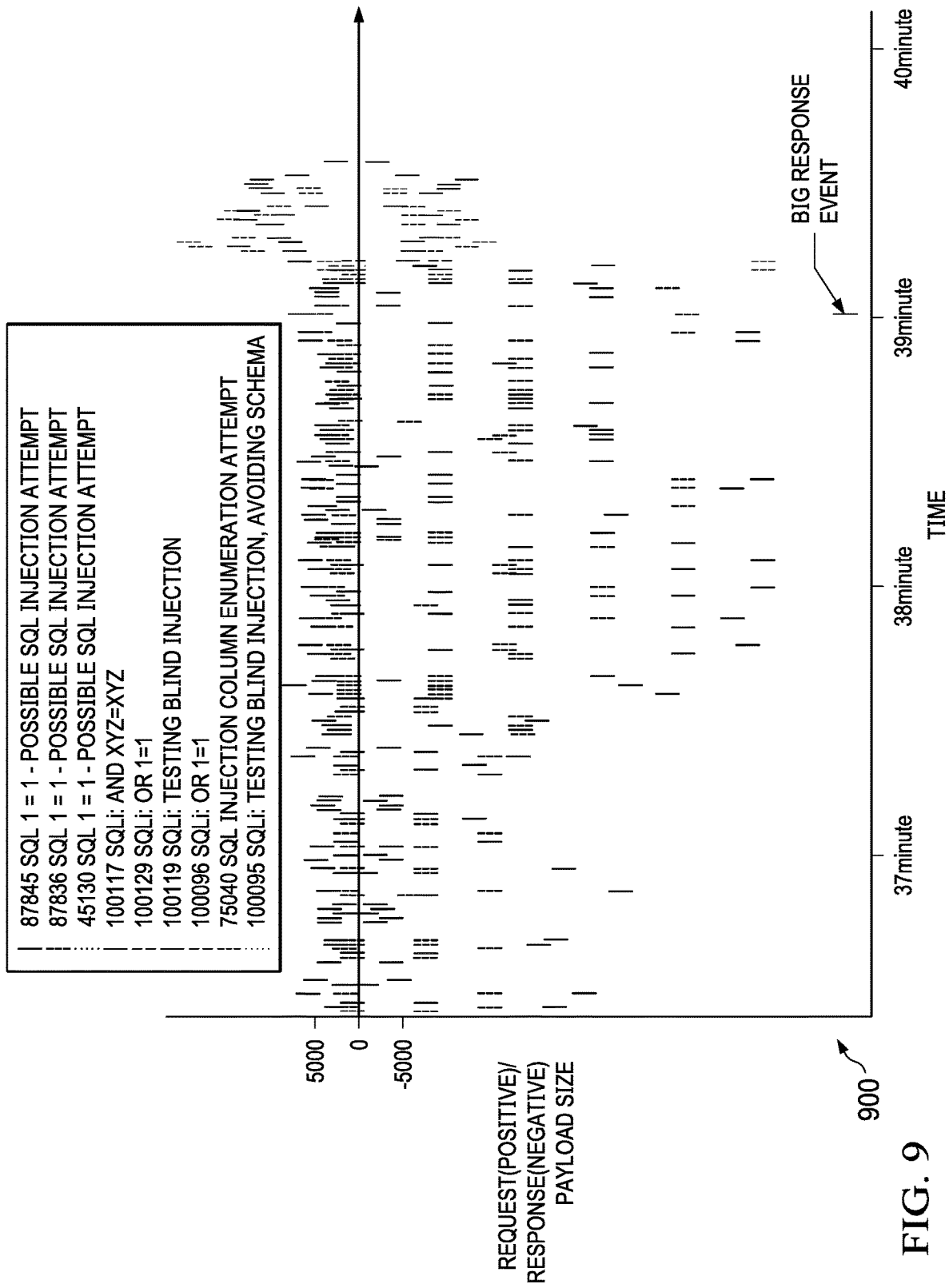

In the example of FIG. 9, the legend on the upper left corner of conversation timeline 900 shows a description of the mapping of the signature. This visualization allows network security analysts to quickly get to the time point where that an attacker switched the gear (e.g., at around the 39-minute mark in the example attack shown in FIG. 9). In this case, the dense event stream runs for about 40 minutes, and then something changed. This scenario would bring a lot of interest to a network security analyst (e.g., to identify where a successful data exfiltration would occur).

It is worth noting that around the gear change (e.g., at around the 39-minute mark in the example attack shown in FIG. 9), an event shows a greater-than-normal response size. In some attacks such as SQL Injection, a victim's greater-than-normal response size (e.g., returning a bigger than normal size content) could likely indicate exfiltration. Generally, in the early stage of such attacks, the victim would return constant rejection message all the way until exfiltration where the victim would then return some meaningful results (e.g., with bigger response size). Such a change in the victim's response could possibly justify why a later attack change style does occur. Accordingly, FIG. 9 exemplifies how such visualization can guide a network security analyst to quickly focus on the right events to conduct a further analysis.

Advantage Case IV: Returning Attacks Identification

Figure 10A:
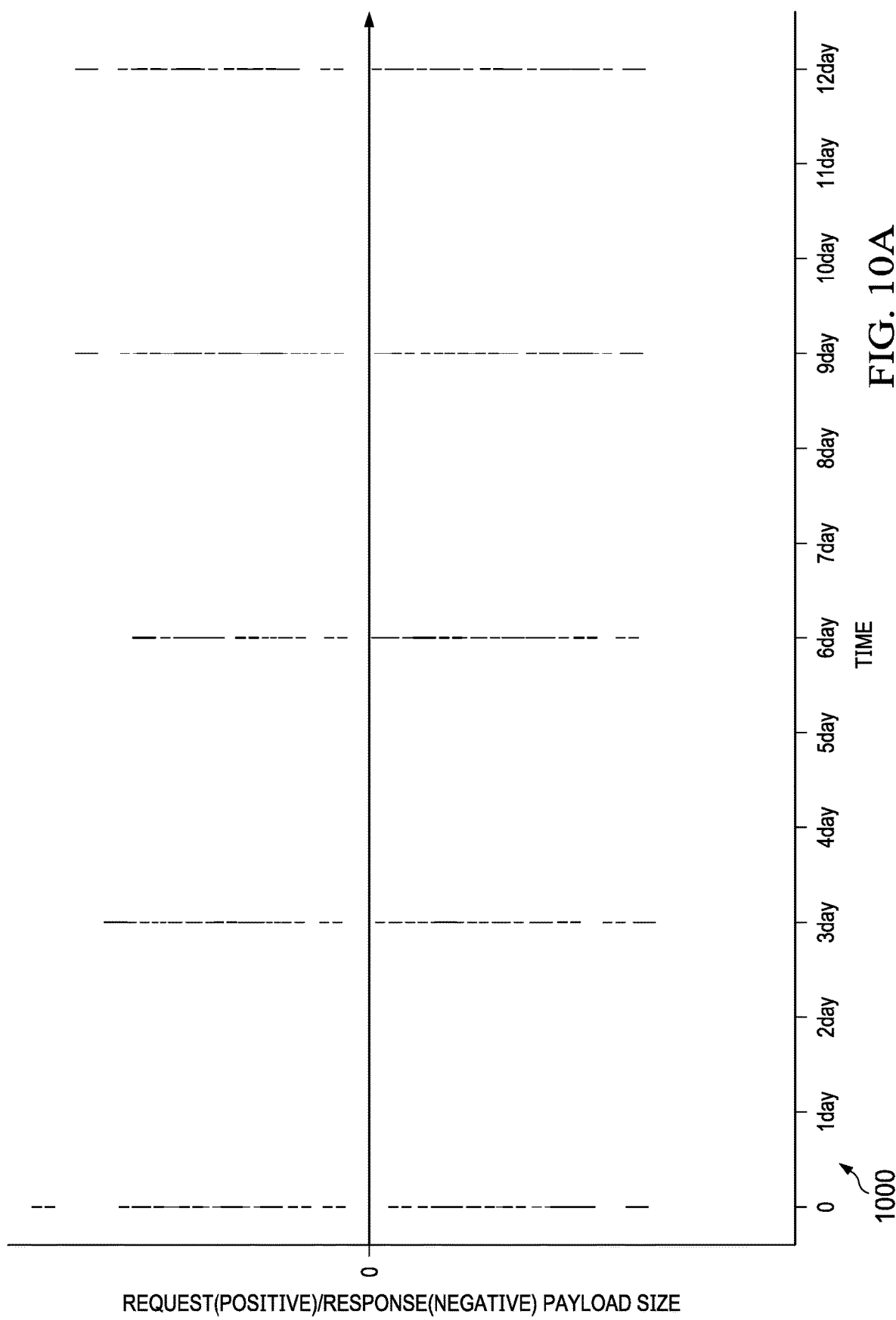

FIG. 10A shows by example attacks that may entail groups of identical attack patterns appearing every three days along conversation timeline 1000. This visualization clearly depicts the attack behavior without diving into numerous individual events. FIG. 10B is a 100× zoom-in view for the first three attacks. As could be seen, these attacks are very similar (have similar attack behavior patterns). This view enables further modeling (by, for instance, security entities, data scientists, network security specialists, etc.) of such attacks. For example, due to the repeatable nature of such attack pattern, a deep learning module described in the above-referenced U.S. patent application Ser. No. 15/819,341, filed Nov. 21, 2017, entitled "SYSTEMS AND METHODS FOR ATTACKER TEMPORAL BEHAVIOR FINGERPRINTING AND GROUPING WITH SPECTRUM INTERPRETATION AND DEEP LEARNING" can be utilized to automatically detect recurring attack patterns and produce a temporal behavior fingerprint to model this attack pattern.

Based on such a temporal behavior fingerprinting model, more automation could be possible to enable an analyst work load reduction. For example, every future attack pattern (which can target a totally different victim) can be compared against this temporal behavior fingerprint. If an attack pattern matches the temporal behavior fingerprint, the analyst will surely know the type of attacks undergoing. Such a machine-automated modeling and prediction is helpful because while it may be possible for humans to recognize the same patterns, it is cost-prohibitive, time-consuming, inefficient, inconsistent, and possibly error-prone for human security analysts to do so manually. These drawbacks can be alleviated or eliminated by utilizing the temporal behavior fingerprinting technology described in the above-referenced U.S. patent application Ser. No. 15/819,341, filed Nov. 21, 2017, entitled "SYSTEMS AND METHODS FOR ATTACKER TEMPORAL BEHAVIOR FINGERPRINTING AND GROUPING WITH SPECTRUM INTERPRETATION AND DEEP LEARNING" which leverages deep learning denoise and decorrelation to produce robust and reliable temporal behavior fingerprints. Note that at least due to pattern composition differences and mutations, without such a temporal behavior fingerprinting technology, it can be extremely difficult, if not impossible, for conventional machines to automatically identify recurring attack patterns from network traffic.

Advantage Case V: Mixed Attacks Identification

In FIG. 11, vertical bars visualized relative to conversation timeline 1100 represent SQL Injection attacks and circular dots visualized relative to conversation timeline 1100 represent cross-site scripting attacks. The co-existence of both types of attacks could indicate that a general vulnerability scanning engine is running. This visualization provides a network security analyst a quick and accurate indication about the severity level of these attacks.

Advantage Case VI: Unprecedented Visual Details

Figure 12A:
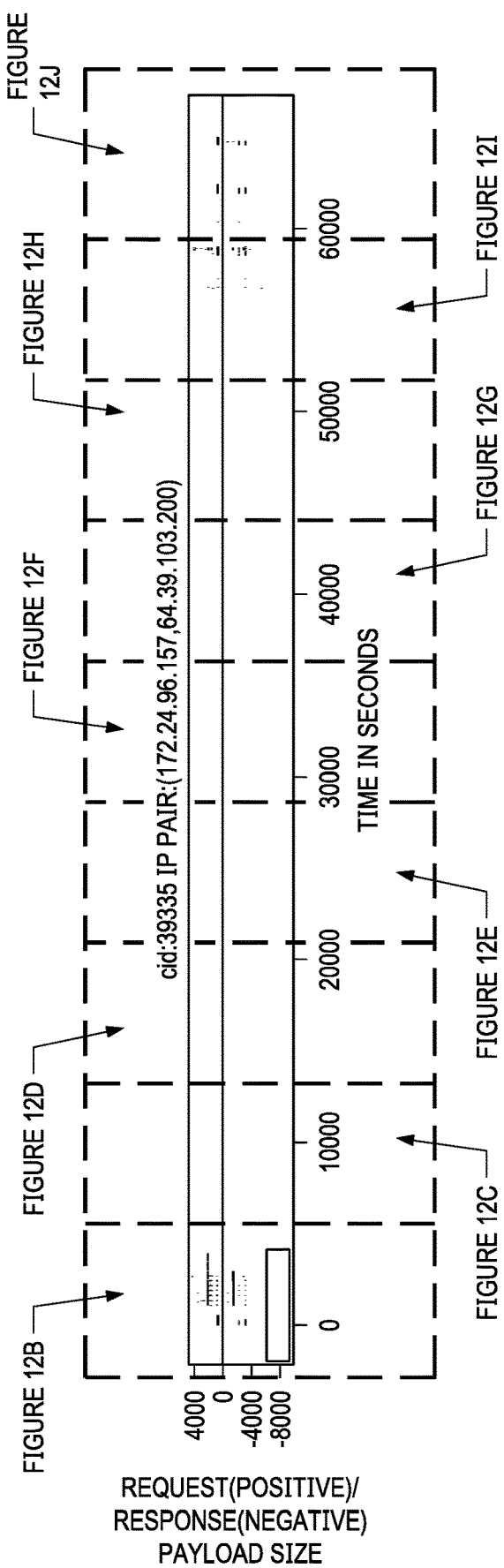
Figure 12B:
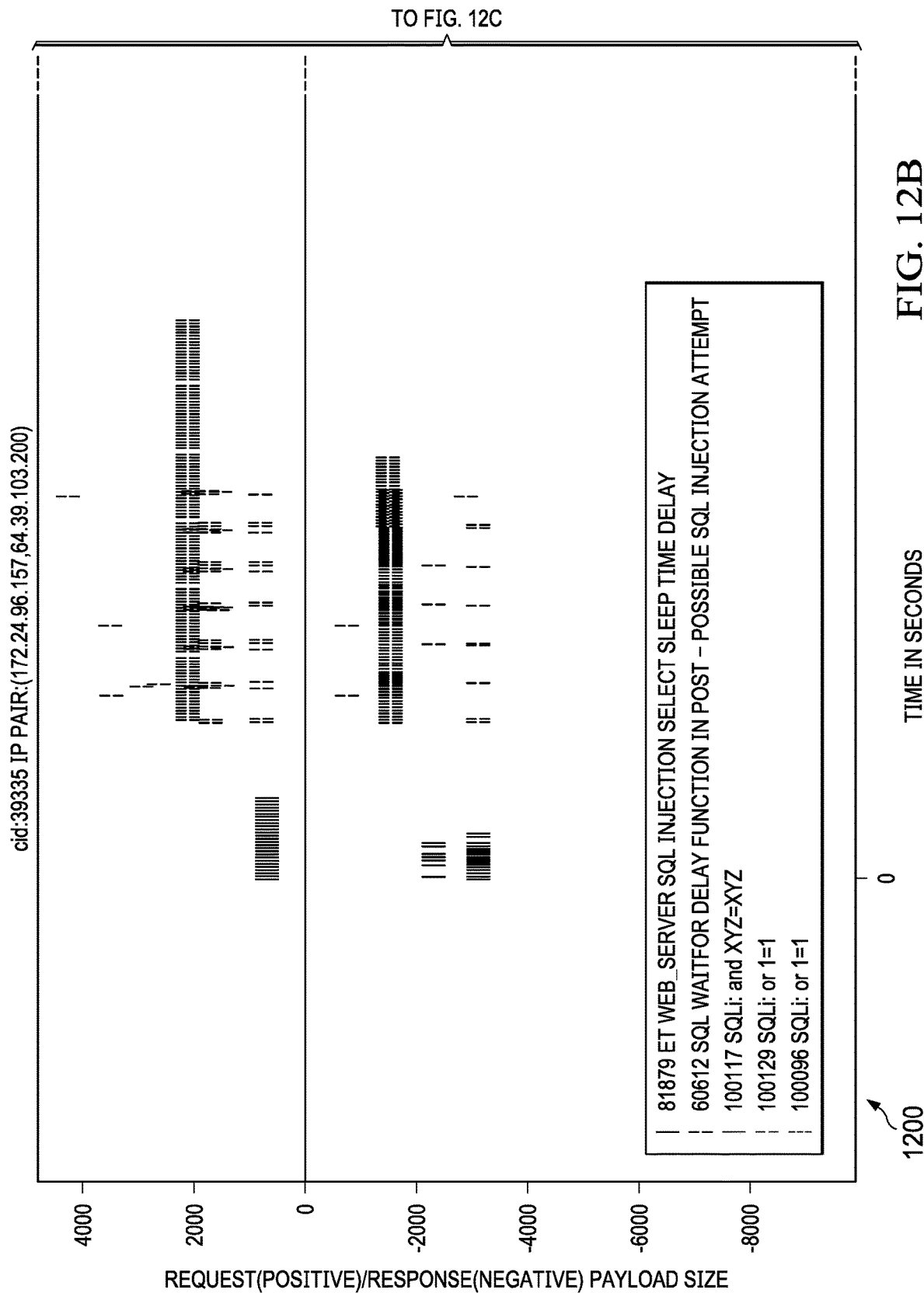
Figure 12C:
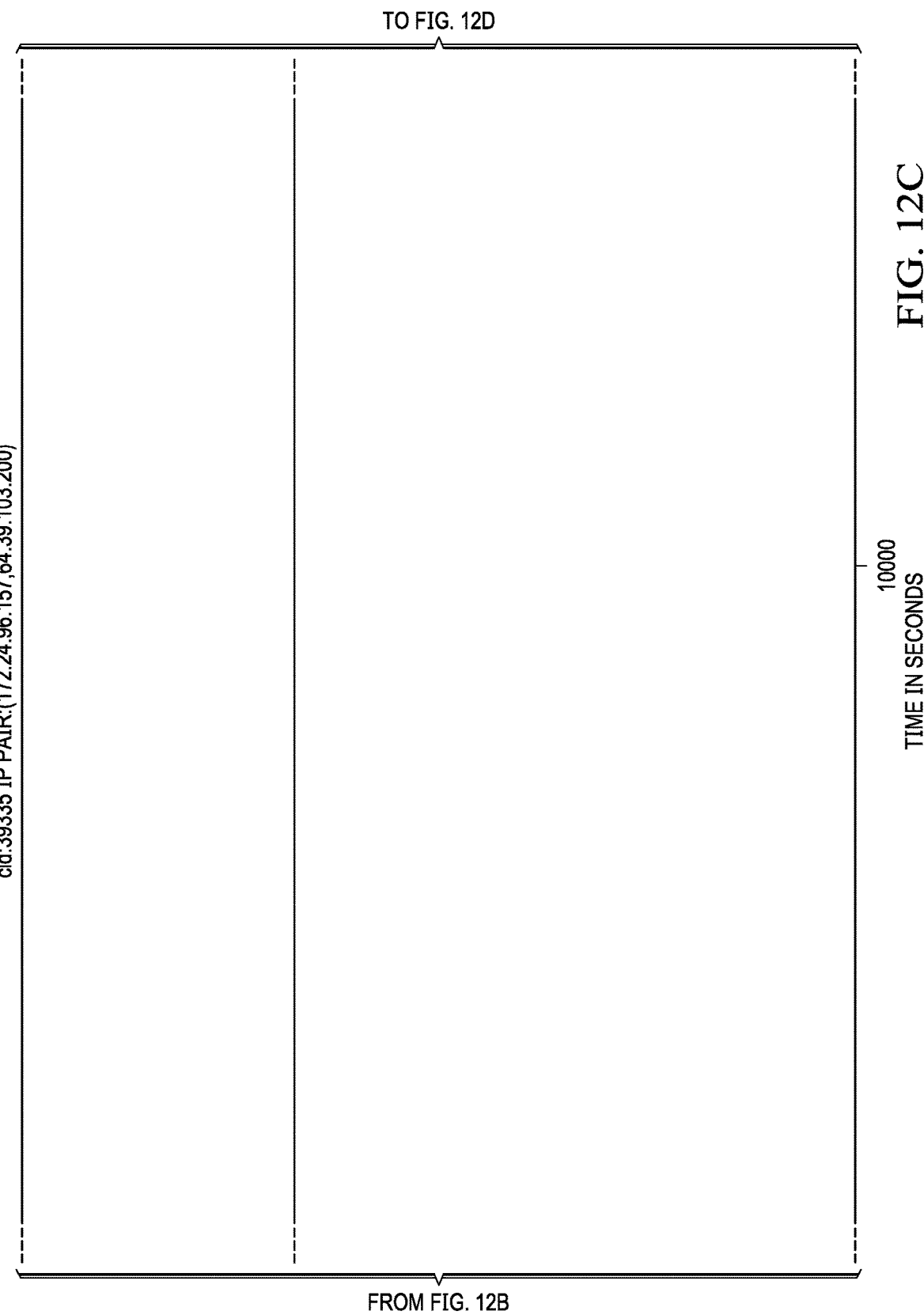
Figure 12I:
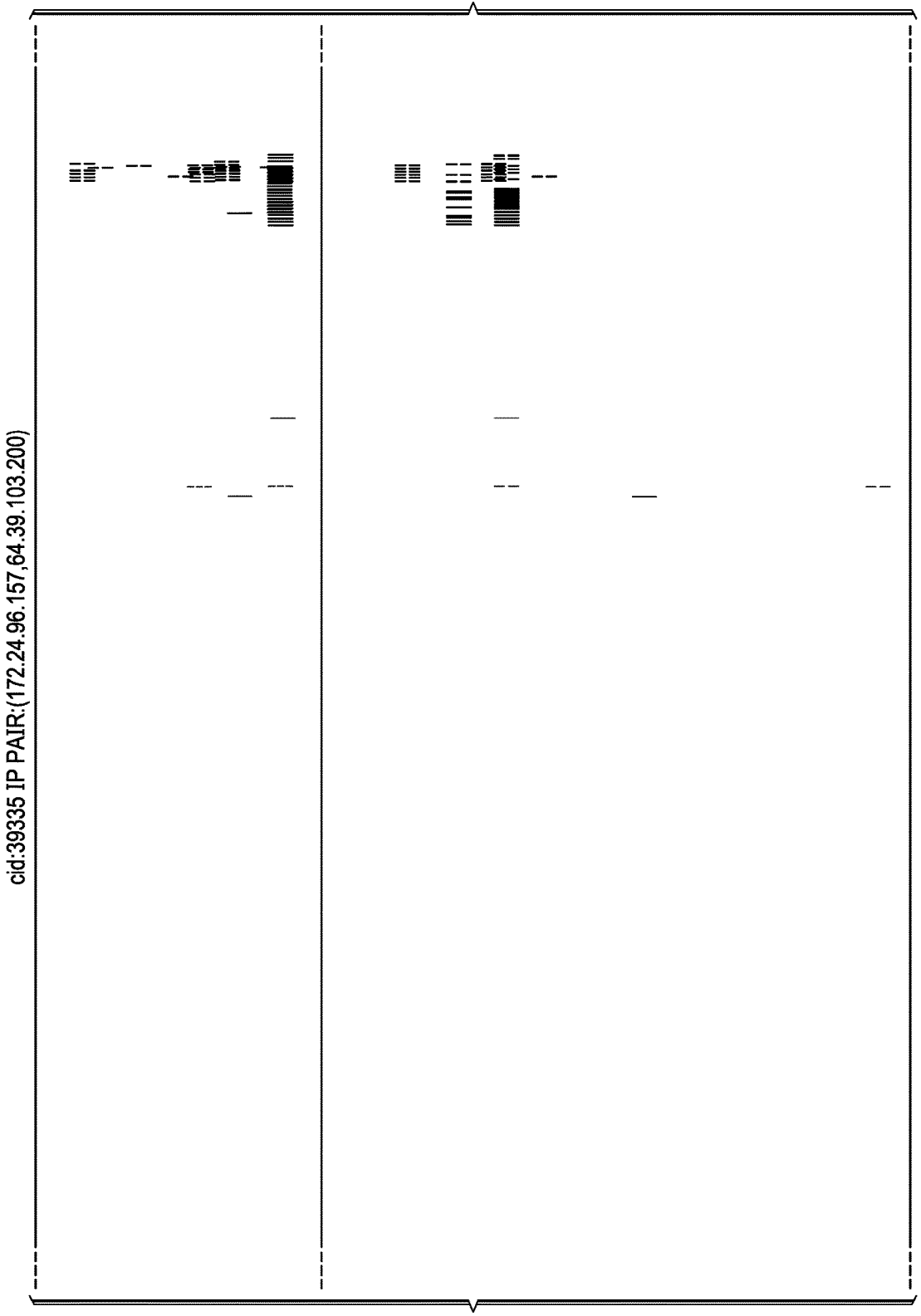
Figure 12J:
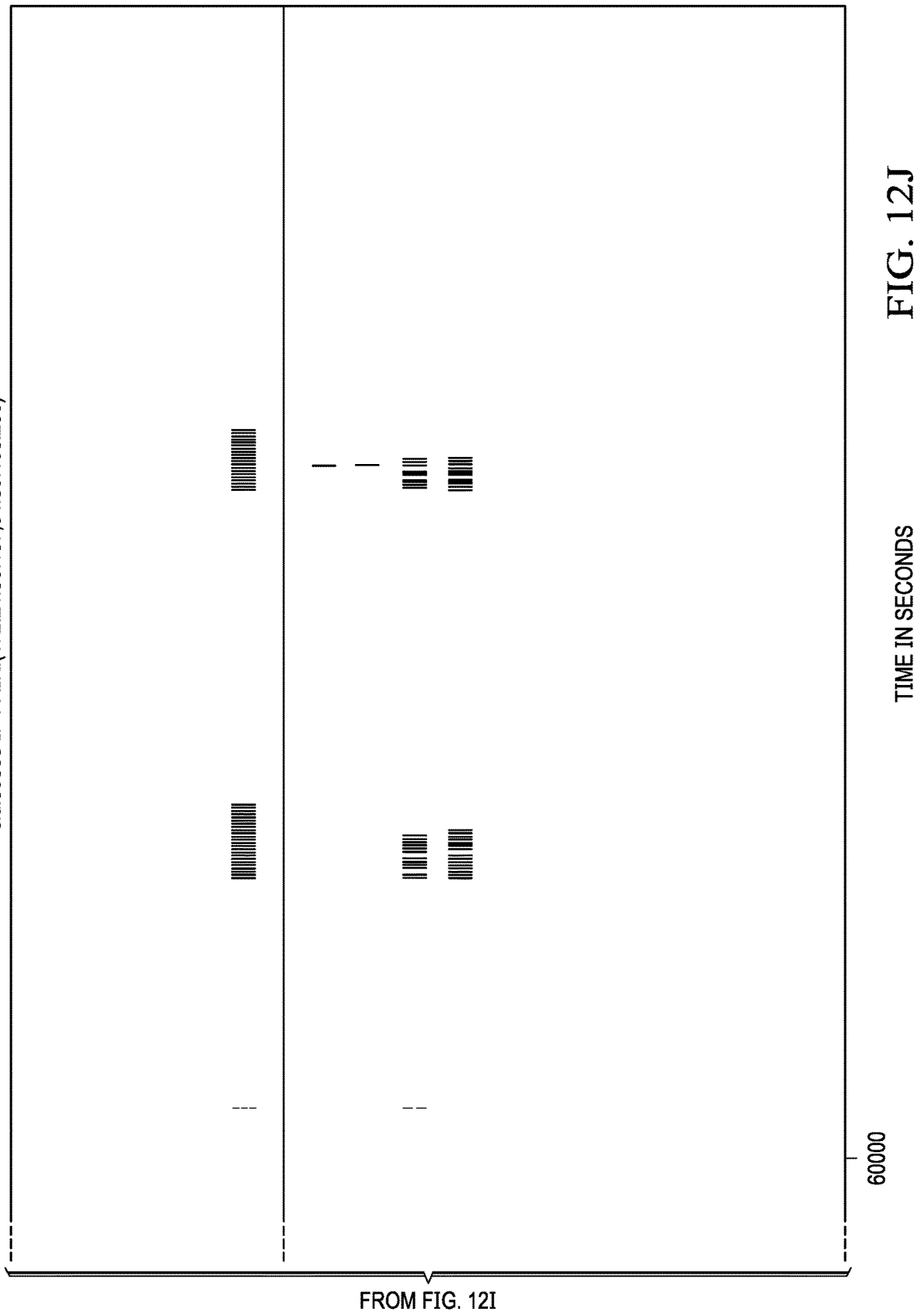

FIGS. 12A-12J illustrate by example unprecedented levels of spatial scale, temporal scale, and visual details embodiments disclosed herein have achieved. FIG. 12A shows an example of a temporal scale of conversation timeline 1200, spanning about 70,000 seconds (19.44 hours) between a source IP address and a destination IP address in a particular computer network. As discussed above, an attack sequence can be collected over about an eight-month period, which can be 5,844 hours or more. While it is not impossible to generate a time sequence over the entire eight-month period, it may be more user-friendly to generate visualizations at a more human-manageable time interval of 70K seconds at a time. This way, a network security analyst can quickly visually identify suspicious events and zoom in to focus their investigation on certain activities of interest, as shown in FIG. 12B, or move on to the next visualization (e.g., FIGS. 12C-12J). The visualization time interval is configurable.

Figure 13:
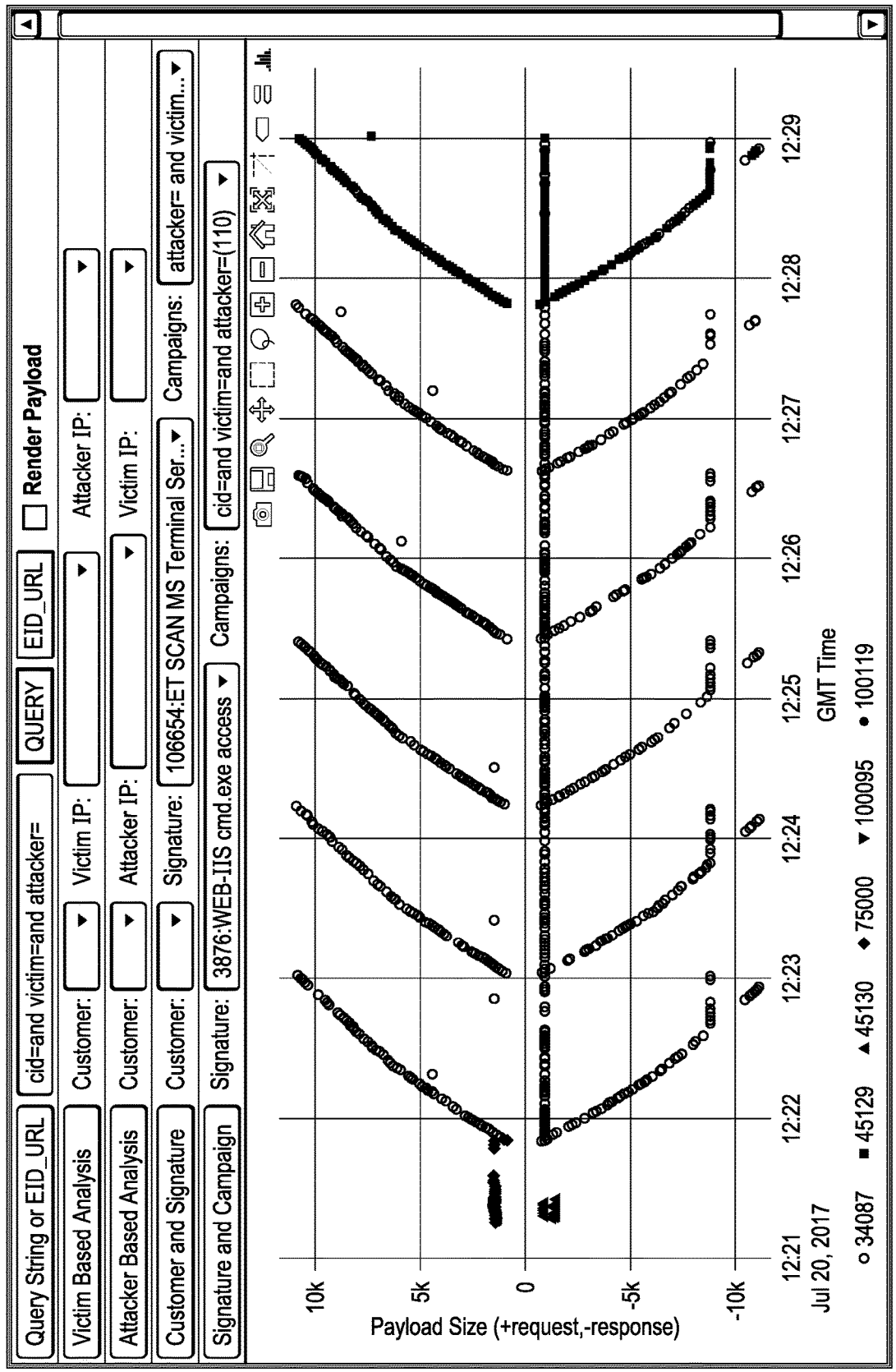
FIG. 13 depicts a diagrammatic representation of an example of a user interface of a network security system disclosed herein showing one example of a threat visualization relative to a time sequence according to some embodiments disclosed herein.

FIG. 13 depicts a diagrammatic representation of an example of a user interface of a network security system according to some embodiments disclosed herein. In FIG. 13, conversation timeline 1300 is shown with different attack patterns, identified by their respective signature IDs (e.g., 34087, 45129, 45130, 75000, 100095, 100119). In some embodiments, multi-dimensional threat visualizer 340 of NSS 300 described above may implement the visualization techniques described above and generate the user interface shown in FIG. 13. A network security analyst can query NSS 300 on a particular signature (an attacker's temporal behavior pattern) and, in response, a visualization of the signature over a conversation timeline is generated by multi-dimensional threat visualizer 340 and presented on the user interface running on the network security analyst's device, showing the temporal behavior pattern of the attacks. As described above, attacks may occur in groups and the visualization enables the network security analyst to quickly analyze such attacks by groups.

Skilled artisans appreciate that other implementations of user interfaces of multi-dimensional threat visualizer 340 are also possible. Thus, FIG. 13 is meant to be non-limiting example of how visualization techniques described above may be implemented and visualized through a user interface.

Figure 14:
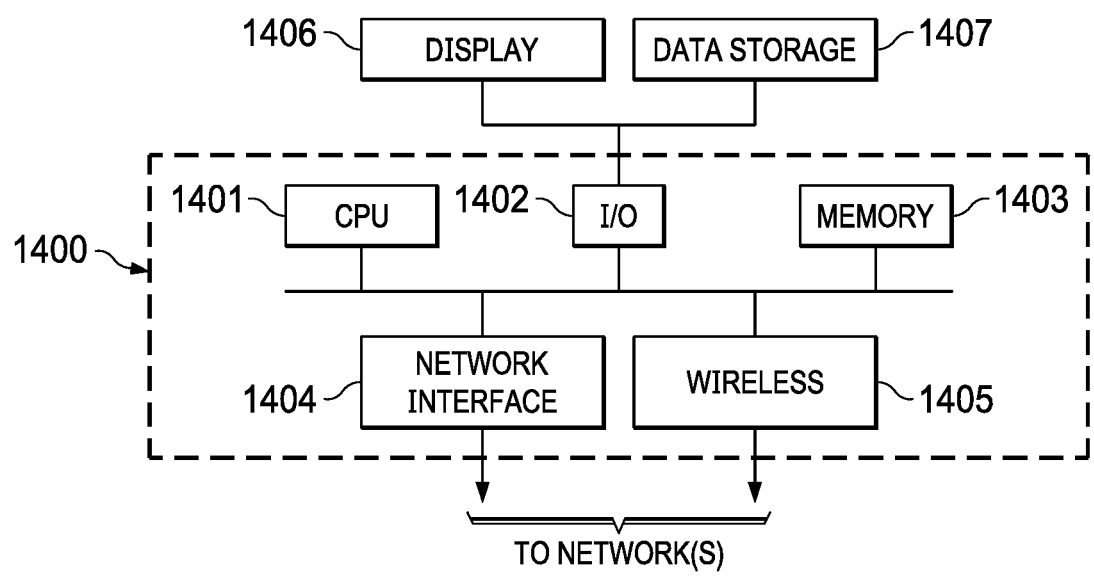
FIG. 14 depicts a diagrammatic representation of one example of a data processing system for implementing embodiments disclosed herein.

FIG. 14 depicts a diagrammatic representation of one example embodiment of a data processing system that can be used to implement embodiments disclosed herein. As shown in FIG. 14, data processing system 1400 may include one or more central processing units (CPU) or processors 1401 coupled to one or more user input/output (I/O) devices 1402 and memory devices 1403. Examples of I/O devices 1402 may include, but are not limited to, keyboards, displays, monitors, touch screens, printers, electronic pointing devices such as mice, trackballs, styluses, touch pads, or the like. Examples of memory devices 1403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1400 can be coupled to display 1406, information device 1407 and various peripheral devices (not shown), such as printers, plotters, speakers, etc. through I/O devices 1402. Data processing system 1400 may also be coupled to external computers or other devices through network interface 1404, wireless transceiver 1405, or other means that is coupled to a network such as a local area network (LAN), wide area network (WAN), or the Internet. The servers and user devices described above may each be a data processing system that is the same as or similar to data processing system 1400. Additionally, functional components necessary to implement embodiments disclosed herein may reside on one or more data processing systems that are the same as or similar to data processing system 1400.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components and mechanisms may be used. The functions of the invention can be achieved in many ways. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. Accordingly, the scope of the invention should be determined by the following claims and their legal equivalents.

What is claimed is:

1. A method for threat visualization with signature composure, spatial scale, and temporal expansion, the method comprising:
   collecting, by a network security system executing on a computer, network security event data over a time period;
   performing a data mining operation on the network security event data collected over the time period, the data mining operation comprising:
   extracting characteristics from the network security event data collected over the time period, the characteristics including a computer network identifier, a source network address, and a destination network address, the destination network address in a computer network monitored by the network security system,
   wherein the characteristics further comprise event time, signature identifier, request size, and response size;
   identifying, by the network security system, unique conversations in the network security event data between each unique pair of a source network address and a destination network address, the identifying utilizing the characteristics extracted from the network security event data collected over the time period, each unique conversation in the network security event data having an event time for each event occurring in the unique conversation;
   sorting, by the network security system, network security events in the unique conversation according to the event time for each event, the network security events associated with signature identifiers that identify different types of attacks;
   determining a spectral signature of the sorted network security events, the spectral signature representing a temporal behavior pattern of attacks to the destination network address;
   assigning, by the network security system, each spectral signature with a unique visual clue;
   determining, by the network security system, a character of the unique visual clue to reflect a number of occurrences of a particular network security event;
   determining, by the network security system, a spatial scale representation of payload sizes associated with the network security events; and
   generating, by the network security system, a visualization relative to a conversation timeline for the time period for presentation on a user interface, the visualization containing unique visual clues for the different types of attacks associated with the spectral signature and the spatial scale representation of the payload sizes associated with the network security events associated with the spectral signature.

2. The method according to claim 1, wherein the visualization is scalable from months, weeks, days, hours, or minutes down to seconds.

3. The method according to claim 1, wherein the visualization is scalable from seconds up to minutes, hours, days, weeks, or months.

4. The method according to claim 1, wherein the time period comprises at least eight months.

5. The method according to claim 1, wherein, for each network security event received by the network security system, the network security system extracts a source network address from which the network security event is originated, a destination network address to which the network security event is destined, a computer network identifier associated with a computer network where the destination network address belongs, a time when the network security event occurs, a signature identifier identifying a type of attack associated with the network security event, a request size associated with a request from the source network address from which the network security event is originated, and a response size associated with a response from the designation network address.

6. The method according to claim 1, further comprising:
   storing the network security event data in a data storage accessible by the network security system.

7. A network security system for threat visualization with signature composure, spatial scale, and temporal expansion, the network security system comprising:
   a processor;
   a non-transitory computer-readable medium; and
   stored instructions translatable by the processor to perform:
   collecting network security event data over a time period;
   performing a data mining operation on the network security event data collected over the time period, the data mining operation comprising:
   extracting characteristics from the network security event data collected over the time period, the characteristics including a computer network identifier, a source network address, and a destination network address, the destination network address in a computer network monitored by the network security system,
   wherein the characteristics further comprise event time, signature identifier, request size, and response size;
   identifying unique conversations in the network security event data between each unique pair of a source network address and a destination network address, the identifying utilizing the characteristics extracted from the network security event data collected over the time period, each unique conversation in the network security event data having an event time for each event occurring in the unique conversation;
   sorting network security events in the unique conversation according to the event time for each event,
   determining a spectral signature of the sorted network security events, the spectral signature representing a temporal behavior pattern of attacks to the destination network address;
   assigning each spectral signature with a unique visual clue;
   determining a character of the unique visual clue to reflect a number of occurrences of a particular network security event;
   determining a spatial scale representation of payload sizes associated with the network security events; and
   generating a visualization relative to a conversation timeline for the time period for presentation on a user interface, the visualization containing unique visual clues for the different types of attacks associated with the spectral signature and the spatial scale representation of the payload sizes associated with the network security events associated with the spectral signature.

8. The network security system of claim 7, wherein the visualization is scalable from months, weeks, days, hours, or minutes down to seconds.

9. The network security system of claim 7, wherein the visualization is scalable from seconds up to minutes, hours, days, weeks, or months.

10. The network security system of claim 7, wherein the time period comprises at least eight months.

11. The network security system of claim 7, wherein, for each network security event received by the network security system, the network security system extracts a source network address from which the network security event is originated, a destination network address to which the network security event is destined, a computer network identifier associated with a computer network where the destination network address belongs, a time when the network security event occurs, a signature identifier identifying a type of attack associated with the network security event, a request size associated with a request from the source network address from which the network security event is originated, and a response size associated with a response from the designation network address.

12. A computer program product comprising a non-transitory computer-readable medium storing instructions translatable by a processor of a network security system to perform:
collecting network security event data over a time period;
performing a data mining operation on the network security event data collected over the time period, the data mining operation comprising:
extracting characteristics from the network security event data collected over the time period, the characteristics including a computer network identifier, a source network address, and a destination network address, the destination network address in a computer network monitored by the network security system,
wherein the characteristics further comprise event time, signature identifier, request size, and response size;
identifying unique conversations in the network security event data between each unique pair of a source network address and a destination network address, the identifying utilizing the characteristics extracted from the network security event data collected over the time period, each unique conversation in the network security event data having an event time for each event occurring in the unique conversation;
sorting network security events in the unique conversation according to the event time for each event, the network security events associated with signature identifiers that identify different types of attacks;
determining a spectral signature of the sorted network security events, the spectral signature representing a temporal behavior pattern of attacks to the destination network address;
assigning, by the network security system, each spectral signature with a unique visual clue;
determining a character of the unique visual clue to reflect a number of occurrences of a particular network security event;
determining a spatial scale representation of payload sizes associated with the network security events; and
generating a visualization relative to a conversation timeline for the time period for presentation on a user interface, the visualization containing unique visual clues for the different types of attacks associated with the spectral signature and the spatial scale representation of the payload sizes associated with the network security events associated with the spectral signature.

13. The computer program product of claim 12, wherein the visualization is scalable from months, weeks, days, hours, or minutes down to seconds.

14. The computer program product of claim 12, wherein the visualization is scalable from seconds up to minutes, hours, days, weeks, or months.

15. The computer program product of claim 12, wherein the time period comprises at least eight months.

16. The computer program product of claim 12, wherein, for each network security event received by the network security system, the network security system extracts a source network address from which the network security event is originated, a destination network address to which the network security event is destined, a computer network identifier associated with a computer network where the destination network address belongs, a time when the network security event occurs, a signature identifier identifying a type of attack associated with the network security event, a request size associated with a request from the source network address from which the network security event is originated, and a response size associated with a response from the designation network address.

17. The computer program product of claim 12, wherein the instructions are further translatable by the processor to perform:
storing the network security event data in a data storage accessible by the network security system.

* * * * *